United States Patent
Minguela et al.

(10) Patent No.: US 7,906,865 B2
(45) Date of Patent: Mar. 15, 2011

(54) INSTALLATION AND METHOD FOR HARNESSING WAVE ENERGY

(75) Inventors: José Pablo Ruiz Minguela, Zamudio (ES); Sabino Elorduizapatarietxe Fadrique, Zamudio (ES); Maria Herrero Eizmendi, Donostia-San Sebastián (ES); Pedro Liria Loza, Pasaia (ES)

(73) Assignee: Oceantec Energias Marinas, S.L., Zamudio (ES)

( * ) Notice: Subject to any disclaimer, the term of this patent is extended or adjusted under 35 U.S.C. 154(b) by 75 days.

(21) Appl. No.: 12/444,274

(22) PCT Filed: Oct. 3, 2006

(86) PCT No.: PCT/ES2006/000549
§ 371 (c)(1),
(2), (4) Date: Jun. 29, 2009

(87) PCT Pub. No.: WO2008/040822
PCT Pub. Date: Apr. 10, 2008

(65) Prior Publication Data
US 2009/0322080 A1    Dec. 31, 2009

(51) Int. Cl.
*F03B 13/10* (2006.01)
(52) U.S. Cl. .......................................... 290/42; 290/53
(58) Field of Classification Search ............ 290/42, 290/43, 53, 54, 55; 60/497, 507; 415/277
See application file for complete search history.

(56) References Cited

U.S. PATENT DOCUMENTS

| | | | |
|---|---|---|---|
| 4,352,023 A | 9/1982 | Sachs et al. | |
| 6,731,018 B1 * | 5/2004 | Grinsted et al. | 290/42 |
| 7,629,704 B2 * | 12/2009 | Hench | 290/53 |
| 7,770,390 B2 * | 8/2010 | Wegener et al. | 60/497 |

FOREIGN PATENT DOCUMENTS

| | | |
|---|---|---|
| EP | 1384824 | 1/2004 |
| FR | 2474601 | 7/1981 |
| GB | 2062114 | 5/1981 |
| GB | 2409898 | 7/2005 |
| JP | 2005207332 | 8/2005 |

OTHER PUBLICATIONS

International Search Report, dated Nov. 11, 2007, issued in International Application No. PCT/ES2006/000549.

* cited by examiner

*Primary Examiner* — J Gon
*Assistant Examiner* — Iraj A Mohandesi
(74) *Attorney, Agent, or Firm* — Knobbe Martens Olson & Bear, LLP

(57) ABSTRACT

Installation for harnessing wave energy, comprising a floating structure (1) that comprises at least one gyroscopic device (5) with a flywheel (6) that can turn by the action of a motor (7) and a generator (10) configured so that when the gyroscopic device (5) is in use, said flywheel (6) is subjected to a pitching torque caused by the motion of the waves that feeds the generator (10), wherein the installation also comprises: means (23, 44) for controlling the motor (7); means (24, 45) for controlling the generator (10); a floating device (25) for capturing data on the waves; means for transmitting the data captured by the data-capturing floating device (25) and for receiving said data in the floating structure (1); a control unit (16) that calculates at least one parameter applicable by the means (23, 44) for controlling the motor (7) and at least one parameter applicable by the means (24, 45) for controlling the generator (10).

13 Claims, 25 Drawing Sheets

|  | | Tp (seg) | | | | | | | | | |
|---|---|---|---|---|---|---|---|---|---|---|---|
|  | | 4 | 6 | 8 | 10 | 12 | 14 | 16 | 18 | 20 | 22 |
| Hs (m) | 0,5 | 0.2 | 0.3 | 0.5 | 0.7 | 0.8 | 0.9 | 0.9 | 1.0 | 1.0 | 0.9 |
| | 1 | 0.2 | 0.3 | 0.5 | 0.7 | 0.8 | 0.9 | 0.9 | 1.0 | 1.0 | 0.9 |
| | 1,5 | 0.2 | 0.3 | 0.5 | 0.7 | 0.8 | 0.9 | 0.9 | 1.0 | 1.0 | 0.9 |
| | 2 | 0.2 | 0.3 | 0.5 | 0.7 | 0.8 | 0.9 | 0.9 | 1.0 | 1.0 | 0.9 |
| | 2,5 | 0.2 | 0.3 | 0.5 | 0.7 | 0.8 | 0.9 | 0.9 | 1.0 | 1.0 | 0.9 |
| | 3 | 0.2 | 0.3 | 0.5 | 0.7 | 0.8 | 0.9 | 0.9 | 1.0 | 1.0 | 0.9 |
| | 3,5 | 0.2 | 0.3 | 0.5 | 0.7 | 0.8 | 0.9 | 0.9 | 1.0 | 1.0 | 0.9 |
| | 4 | 0.2 | 0.3 | 0.5 | 0.7 | 0.8 | 0.9 | 0.9 | 1.0 | 1.0 | 0.9 |
| | 4,5 | 0.2 | 0.3 | 0.5 | 0.7 | 0.8 | 0.9 | 0.9 | 1.0 | 1.0 | 0.9 |
| | 5 | 0.2 | 0.3 | 0.5 | 0.7 | 0.8 | 0.9 | 0.9 | 1.0 | 1.0 | 0.9 |
| | 5,5 | 0.2 | 0.3 | 0.5 | 0.7 | 0.8 | 0.9 | 0.9 | 1.0 | 1.0 | 0.9 |

FIG. 12

| SH (%) | 4 | 6 | 8 | 10 | Tp 12 | 14 | 16 | 18 | 20 | 22 |
|---|---|---|---|---|---|---|---|---|---|---|
| 0.50 | 0.158 | 0.746 | 0.526 | 1.009 | 0.767 | 0.294 | 0.095 | 0.021 | | |
| 1.00 | 0.441 | 4.53 | 3.626 | 6.832 | 7.463 | 2.911 | 0.652 | 0.095 | 0.042 | |
| 1.50 | 0.011 | 1.514 | 4.089 | 6.243 | 8.829 | 4.572 | 0.946 | 0.168 | 0.063 | 0.011 |
| 2.00 | | 0.284 | 2.449 | 3.805 | 6.601 | 4.541 | 0.956 | 0.095 | 0.021 | 0.011 |
| 2.50 | | 0.032 | 1.219 | 2.018 | 3.458 | 3.258 | 1.209 | 0.116 | 0.042 | 0.032 |
| 3.00 | | | 0.336 | 1.219 | 2.092 | 2.144 | 0.536 | 0.074 | 0.032 | |
| 3.50 | | | 0.105 | 0.673 | 1.009 | 1.398 | 0.536 | 0.137 | 0.021 | |
| 4.00 | | | | 0.2 | 0.411 | 0.62 | 0.357 | 0.084 | 0.011 | |
| 4.50 | | | | 0.032 | 0.147 | 0.242 | 0.179 | 0.053 | 0.011 | |
| 5.00 | | | | 0.021 | 0.042 | 0.179 | 0.074 | 0.011 | 0.011 | |
| 5.50 | | | | | 0.021 | 0.105 | 0.053 | 0.021 | 0.021 | |

FIG. 14

INSTALLATION AND METHOD FOR HARNESSING WAVE ENERGY

RELATED APPLICATIONS

This application is a U.S. National Phase of International Application No. PCT/ES2006/000549, filed Oct. 3, 2006, designating the U.S. and published on Apr. 10, 2008 as WO 2008/040822. The content of this application is incorporated herein by reference in its entirety.

FIELD OF THE INVENTION

The present invention belongs to the field of systems for converting wave energy. More specifically, the present invention relates to an off-shore system for converting wave energy.

BACKGROUND OF THE INVENTION

Efforts have been made for a long time to harness the energy generated by ocean waves. Among the methods used traditionally for this purpose are on-shore systems.

However, on-shore systems and methods for converting wave energy suffer from certain drawbacks, foremost among which are the poor efficiency of the energy potential, their great environmental impact and the social rejection of said environmental impact.

To overcome these drawbacks, off-shore methods and systems have been proposed for harnessing wave energy. Off-shore systems can be of two types, submerged or based on floating structures. Submerged off-shore systems have the drawback that the off-shore energy distribution decreases exponentially with the distance to the surface. For this reason, off-shore systems based on floating structures are predominant, as they can capture the energy where its concentration is greatest.

Off-shore systems based on floating structures comprise a floating structure, subjected to the effect of waves, on which one or several wave energy converters are mounted. Three main types of floating off-shore systems can be identified: (a) point absorbers, (b) attenuators and (c) terminators. FIG. 1 shows a diagram of the wave direction (direction of the arrow) with respect to the wave front for each type of floating off-shore system. The attenuators (represented in FIG. 1(b)) are elongated structures placed parallel to the direction of travel of the waves, extracting energy in a gradual manner, so that their equivalent capture width is considerably greater than that of the point absorbers (represented in FIG. 1(a)). According to David Evans in "The hydrodynamic efficiency of wave-energy devices", Hydrodynamics of Ocean Wave-Energy Utilization, Lisbon, Springer-Verlag: 1-34, 1985, ideally their absorption capacity can be up to three times more than point absorbers. In short, this means a greater power generation capacity per unit weight of the converter. On the other hand, these systems are less exposed to damage and require lower mooring efforts than terminators.

However, most floating off-shore systems require a fixed reference for their operation (anchoring to sea base or ballast), which increases the mooring loads. In addition, these devices are sensitive to tides and their installation and maintenance are more complex.

There are some off-shore floating systems that do not need an external reference, based on either the relative motion between two or more bodies or on inertial motion.

Inertial systems have fully encapsulated mobile components, increasing protection against marine corrosion, thereby reducing maintenance costs, risk of malfunction and risk of polluting the environment (for example fluid leaks). Known inertial systems are based exclusively on the oscillating mass principle (sliding on a guide or pendulum). As gravity is the restoring force, their yield is low unless the oscillating mass is acted upon at zero-velocity points (by latching). However, their control is very complex as it is hard to find the optimum point at which to release the mass, given the variability of the waves.

On the other hand, also known are flywheels for stabilising the rocking motion of ships. These flywheels, known as gyroscopes, use the restoring force resulting from the gyroscopic effect which ideally would allow a full transmission of the wave's external torque to another internal component. In addition, it is relatively easy to keep them in phase by an active control of the rotational speed and the resistance torque. U.S. Pat. No. 4,352,023 describes a floating body joined to a power transducer that allows transforming the motion of the waves into the rotation of a shaft. This system is based on two casings, one of which is joined to a gyroscope coupled to a motor that allows it to rotate. Due to the gyroscopic effect, as the flywheel is constantly turning, the pitch and roll motion to which the floating body is subjected by the waves becomes an oscillating motion along an outlet shaft perpendicular to the drive motor shaft. By an appropriate coupling, the oscillating motion is transformed into a unidirectional rotation that drives an electrical generator.

However, this system has several drawbacks, as the gyroscope of said system cannot adapt to external conditions such as wave type, frequency or height. For this reason, the use of wave energy is very low. To adapt to external conditions, this is, to the excitatory moment of the wave, it is necessary to adapt two factors: the rotation speed and the resistance torque. Controlling the rotation speed allows controlling the amplitude of the oscillation or rolling to obtain a maximum energy capture. Controlling the resistance torque allows maintaining the oscillation of the converter in phase with the excitatory moment to obtain a positive balance of captured energy.

However, the system described in U.S. Pat. No. 4,352,023 does not consider controlling the capturing device according to the external wave conditions, so that its energy efficiency is very low. In addition, its control system acts only on the rotation speed, without controlling the resistance torque, which is a very important factor. For this reason, the efficiency of U.S. Pat. No. 4,352,023 for harnessing wave energy is very low.

OBJECT OF THE INVENTION

The object of the present invention is an off-shore installation or floating system for harnessing wave energy, of the attenuator type and with an inertial relative motion based on a flywheel that solves the aforementioned drawbacks. This installation is easily moored and is designed to maximise the energy extracted in one direction. In addition, it incorporates a minimum number of mobile components protected by the structure. The installation or system object of the present invention applies new technologies (electronics, communications, new surface treatments) to minimise maintenance costs and increase its lifetime.

The installation or system for harnessing wave energy comprises a floating structure on or inside which is at least one gyroscopic device, which comprises a flywheel disposed such that it can turn driven by a motor placed on a shaft of said flywheel, and a generator placed on a shaft orthogonal to the aforementioned flywheel shaft, the generator being configured such that when the gyroscopic device is in use the flywheel is subjected to a pitching torque caused by the movement of the waves that can feed said generator. The installation also comprises means for controlling the motor, means for controlling the generator, a floating data capture device to capture data on the waves, means for transmitting the data captured by the floating data capture device and receiving said data in the floating structure, a control unit that, from the data captured by the floating data capture device, calculates at least one parameter applicable by the means to control the motor and at least one parameter applicable by the means to control the generator.

Preferably, the data captured by the floating data capture device are a: least the wave height and period, and more preferably the wave peak period.

Preferably, said at least one parameter applicable by the means for controlling the motor is a rotation speed, more preferably an optimum rotation speed or velocity.

Preferably, said at least one parameter applicable by the means for controlling the generator is a resistance torque, more preferably an optimum resistance torque.

Preferably, said means for controlling the motor comprise at least a control device and a power converter.

Preferably, said means for controlling the generator comprise at least a control device and a power converter.

Preferably, said means for transmitting and receiving the captured data are wireless transmission/reception means.

Preferably, the gyroscopic device is placed in a vacuum chamber.

Preferably, the floating structure has an elongated shape, with a breadth/length ratio of 1/12 to 1/6.

Preferably, the floating structure also comprises ballast elements placed on the ends of said floating structure.

Preferably, the floating structure also comprises a mooring system.

Preferably, the floating structure also comprises a device for correcting its position with respect to the direction of the waves.

Preferably, the generator is a rotating generator.

Furthermore, another object of the invention is a method for harnessing wave energy that can be used off shore. This method comprises the following stages: Subjecting a gyroscopic device placed in a floating structure to a pitching motion caused by waves; making turn a flywheel of said gyroscopic device driven by a motor, so that the pitching motion caused by the waves is transformed into an oscillating rolling motion around a shaft; driven by said oscillating rolling motion a generator placed on an orthogonal axis to the aforementioned flywheel shaft; capturing a series of data on the waves; sending said data to a control unit placed in said floating structure; calculating at least one parameter applicable to said motor and at least one parameter applicable to the generator from said data obtained on the waves; applying said parameters to the motor and generator respectively.

BRIEF DESCRIPTION OF THE FIGURES

To complete the description being made and to aid a better understanding of the characteristics of the invention, according to an example of a preferred embodiment, a set of drawings is accompanied that form an integral part of this description in which, for purposes of illustration and in a non-limiting sense, the following is shown:

FIG. 12 shows a table representing the variation of the rotation speed coefficient as a function of the wave period and height.

FIG. 14 shows a table representing the wave height and period scatter diagram characteristic of the surroundings of the Bilbao seaport.

DETAILED DESCRIPTION OF THE INVENTION

Described below with reference to the figures are the various embodiments of the installation or system of the present invention.

In addition, the term "approximately" must be understood as specifying values that are very close to those stated. An expert in the art will understand that a small deviation in the values specified, within reasonable margins, is inevitable due to measurement inaccuracies, etc.

Furthermore, in the context of the present invention the following terms must be interpreted as defined below:

The terms "pitch" and "roll" must be interpreted according to the conventions used in naval engineering.

The reference coordinate system is placed with the X-axis towards the prow of the energy converter, the Y-axis towards the port side and the Z-axis upward. The origin of the coordinates is placed in the centre of gravity of the converter.

Figure 20:
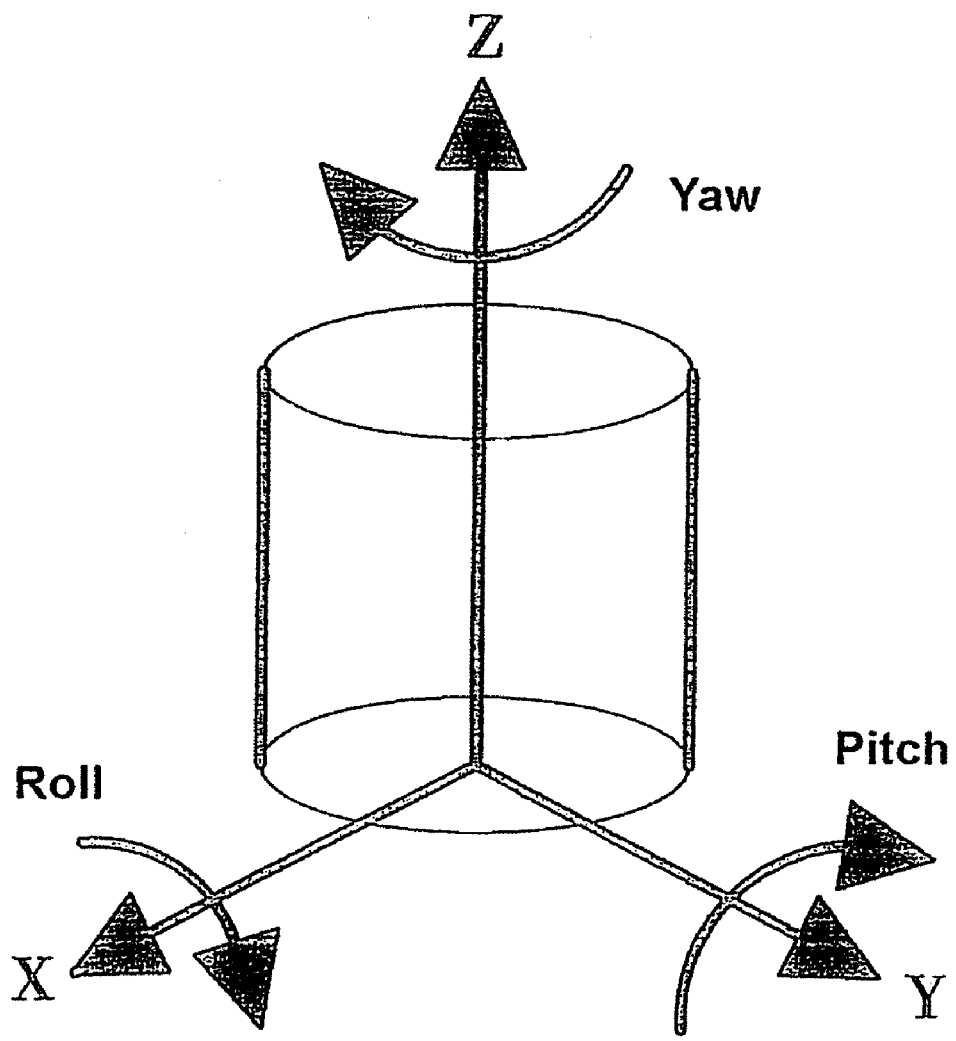
FIG. 20 shows the convention used in naval engineering.

To illustrate these concepts, FIG. 20 shows the convention used in naval engineering: When a wave front moves in the direction of the X-axis, a longitudinal displacement (surge) occurs on said X-axis and a rotation around it called roll, labelled in FIG. 20 as (roll). As a result of this wavefront, a lateral displacement (sway) and a rotation (pitch) occur (labelled in FIG. 20 as (pitch)). On the Z-axis, a vertical displacement (heave) and a rotation (yaw) both occur (labelled in FIG. 20 as (yaw)).

Thus, the following definitions are established:

Pitch: angular displacement along the vertical axis of the device (Y-axis).

Roll: angular displacement in the vertical plane about the longitudinal axis of the device (X-axis).

Wave excitatory moment: torque exerted by the wave about the pitch Y-axis of the converter.

Pitch torque: Torque actually transmitted to the energy converter in view of its hydrodynamic performance.

Angular moment of the flywheel: product of the flywheel moment of inertia with respect to the Z—axis and its rotational angular velocity.

Generator resistance torque: Torque opposed by the generator in the X-axis of the energy converter.

Longitudinal inertia: moment of inertia of the energy converter with respect to the Y-axis of the coordinate system.

The system or installation for harnessing wave energy, that is, the energy converter system, located off-shore comprises at least the following elements: a floating structure that incorporates, among other elements, an energy capturing device or gyroscopic system comprising a flywheel driven by a motor; means for controlling the motor, preferably for controlling the motor torque; a floating device or buoy for capturing data; wireless means for transmitting/receiving data; a control unit for the data captured by the buoy; a rotating generator and means for controlling it, preferably for controlling the variation in the resistance torque of said generator.

These elements and their operation in the energy harnessing installation are described in detail below.

The system or installation for harnessing wave energy, this is, the energy converter system, is based on the relative inertial motion caused by waves in a gyroscopic device or energy capturer. Said motion is used to feed an electric generator through several intermediate transformation stages. The energy capturing device or gyroscopic device, hereinafter referred to as the gyroscopic device, is placed inside or on a floating structure. This structure preferably has an elongated shape and is kept aligned with the direction of travel of the waves as explained below, causing a pitching motion of said structure.

Figure 1:
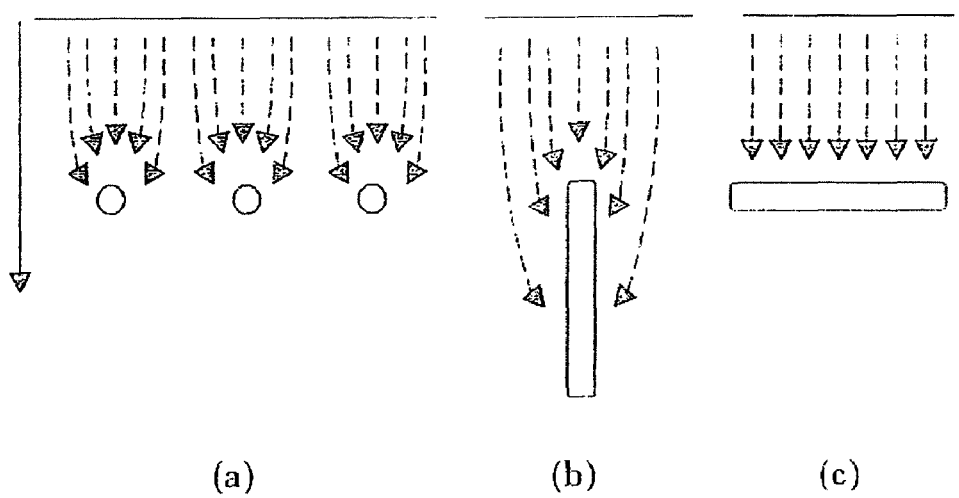
FIG. 1 shows a schematic representation of the three main types of floating off-shore systems.
Figure 2:
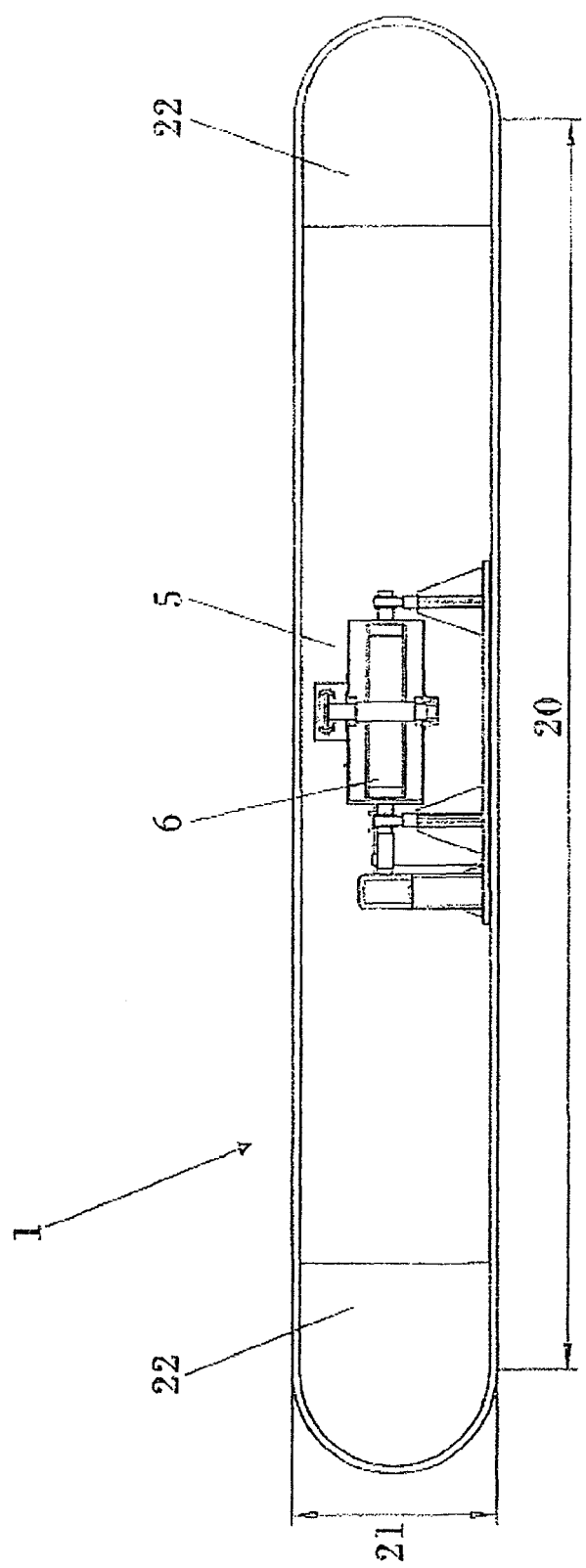
FIG. 2 shows a floating structure according to an embodiment of the present invention.

FIG. 2 shows a floating structure (1) according to an embodiment of the present invention. This floating structure (1) must not be understood as limiting the invention but merely as an illustrative and non-limiting example. On or inside the floating structure (1) is a gyroscopic device (5) which in turn comprises at least one flywheel (6). The floating structure (1) preferably comprises a single gyroscopic device (5) but it is not limited to one gyroscopic device, and may comprise more than one in specific embodiments of the invention.

Figure 3:
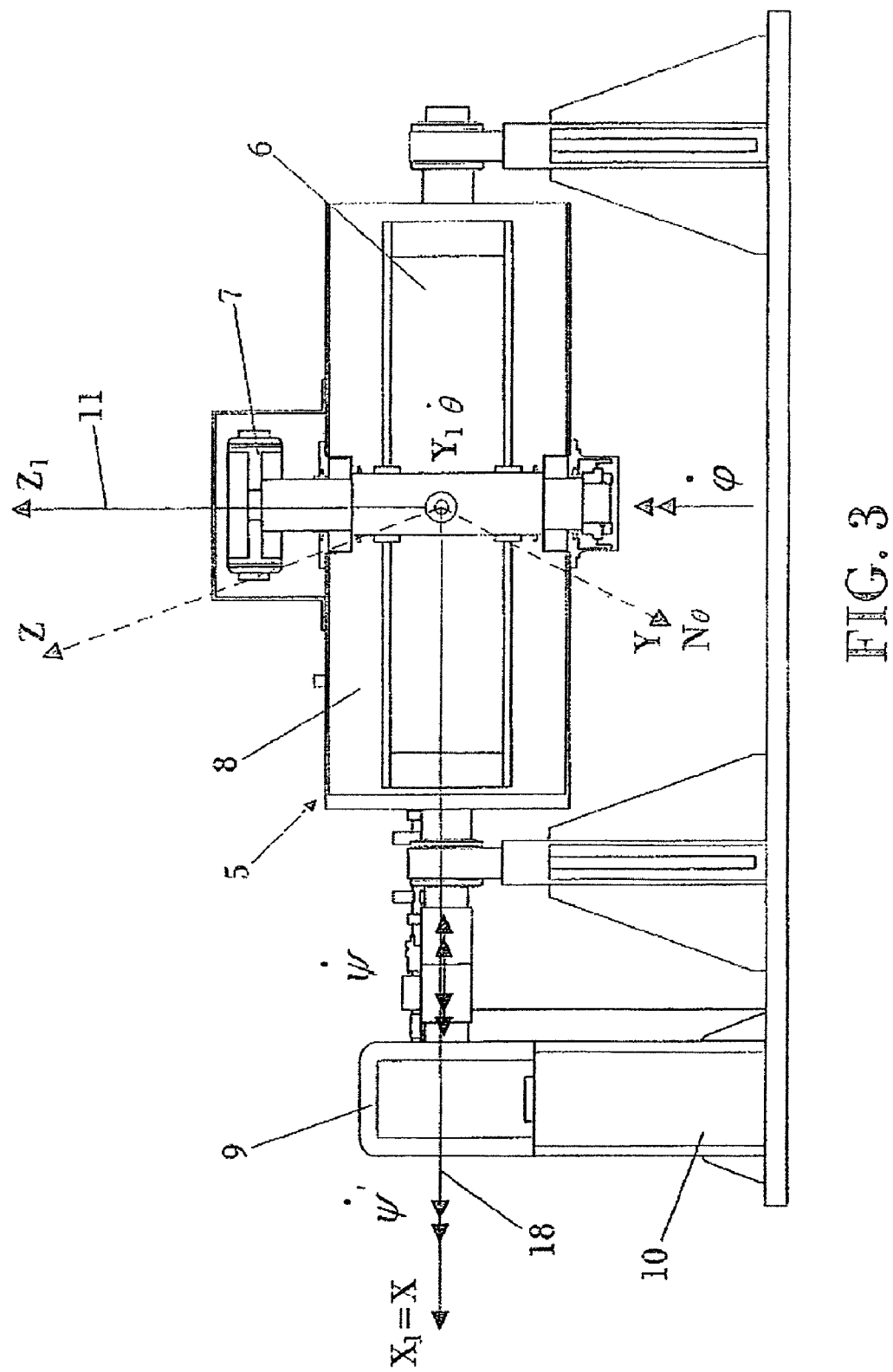
FIG. 3 shows the internal configuration of a gyroscopic device according to an embodiment of the present invention.

The internal configuration of said gyroscopic device (5) is shown in FIG. 3. The gyroscopic device (5) comprises a flywheel (6). This flywheel (6) revolves constantly due to the action of a motor (7). The flywheel (6) is mounted on a casing (8) that only allows it to turn by the action of the motor (7) around its vertical axis of revolution Z (11). The axes "X", "Y" and "Z" of FIG. 3 represent a fixed reference system, while the axes "$X_1$", "$Y_1$" and "$Z_1$" represent the reference system relative to the flywheel (6). The flywheel (6) also has a longitudinal axis (18), orthogonal to the Z—axis, that is the longitudinal axis of the converter system or X-axis. The floating structure (1) is constantly subjected to a pitching motion caused by the action of the waves on the Y-axis of the converter system, and therefore on the flywheel (6). By the gyroscopic effect, the continuous rotation of the flywheel (6) opposes the pitching motion, causing an oscillating rolling motion ($\dot{\Psi}$) around the longitudinal X-axis (18). This oscillating rolling motion ($\dot{\Psi}$) is later transformed into a unidirectional rotation motion ($\dot{\Psi}'$) by a coupling (9). Said oscillating motion ($\dot{\Psi}'$) feeds a generator (10). This is explained in detail further below. In addition, in FIG. 3, $\dot{\phi}$ indicates the rotation speed, $\dot{\theta}$ indicates the pitch speed and $N_\theta$ indicates the pitching torque.

Figure 4A:
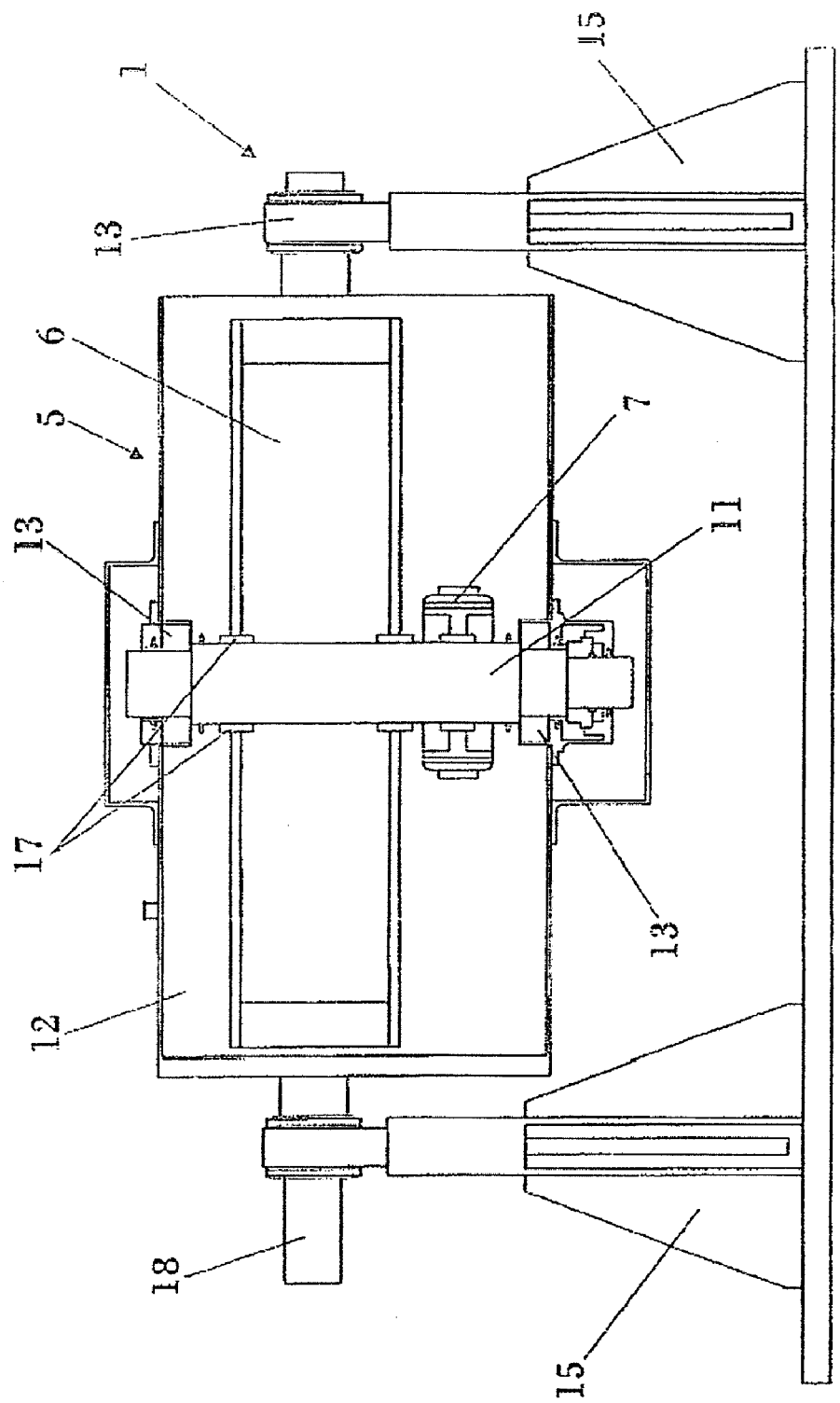
FIGS. 4A, 4B and 4C show three possible embodiments of the gyroscopic device and its connection to the floating structure of the present invention.
Figure 4B:
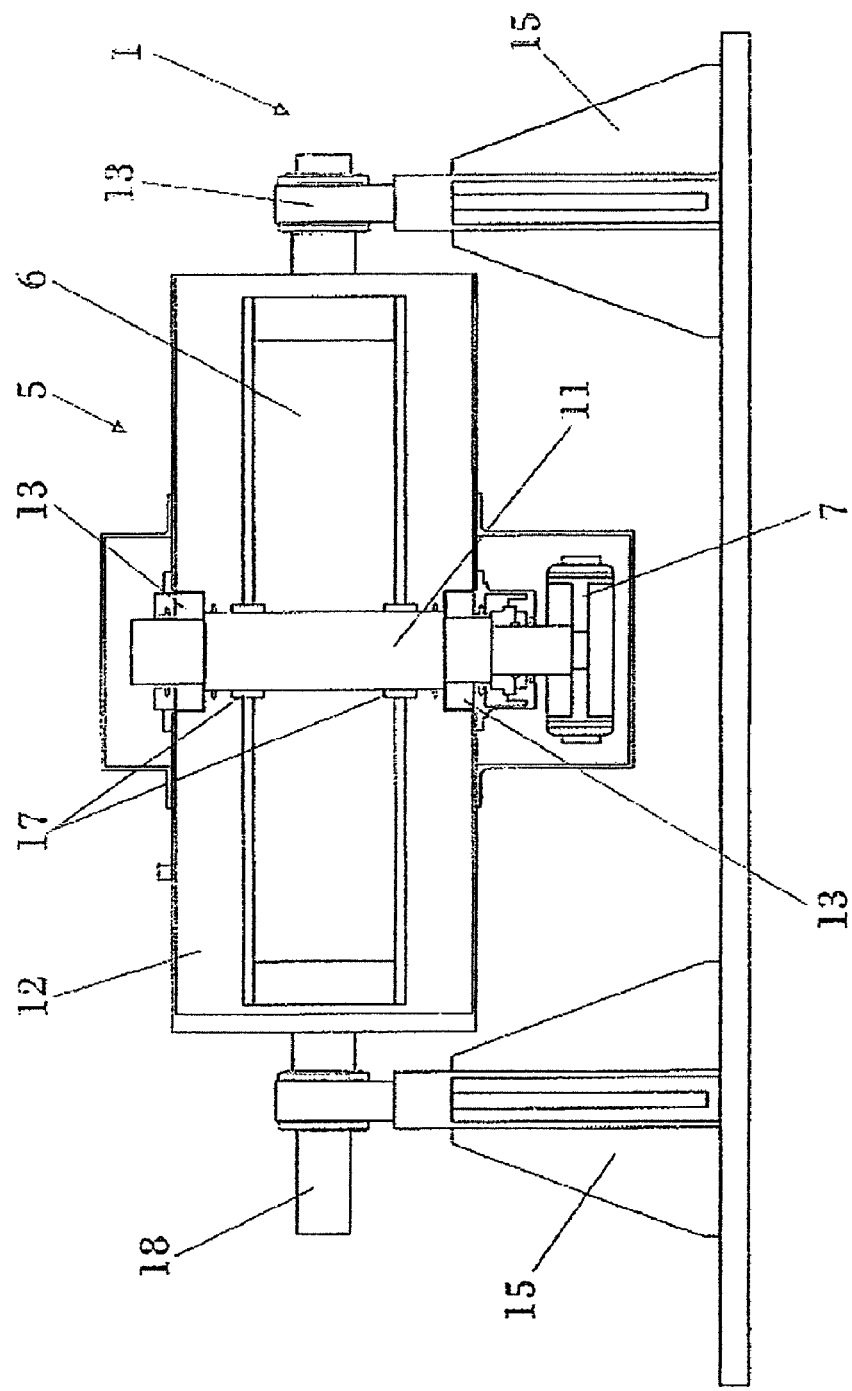
Figure 4C:
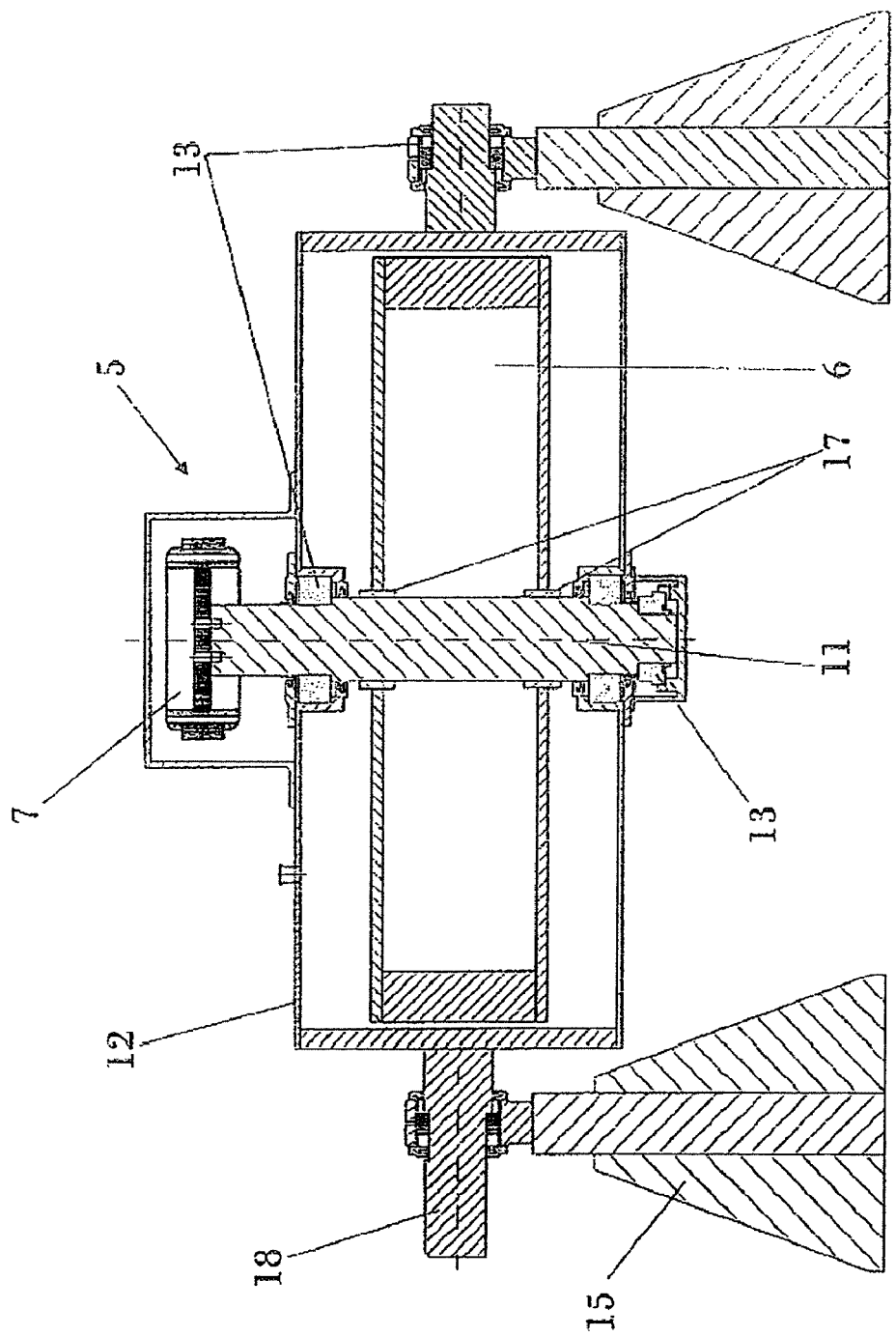

FIGS. 4A, 4B and 4C show three configurations of the gyroscopic device (5) according to three possible embodiments of the present invention.

The flywheel (6) acts as an energy capturing element in the system. The dimensions of the flywheel (6) can vary depending on the energy that must be obtained from the system and the material with which it is made. The material used to manufacture the flywheel (6) is selected among highly-resistant materials. For example, it can be made from high-resistance steels, steels in general, composite materials (metal matrix composites, ceramic matrix composites and organic matrix composites), aluminum or other suitable materials known in the state of the art and/or combinations thereof.

Figure 4D:
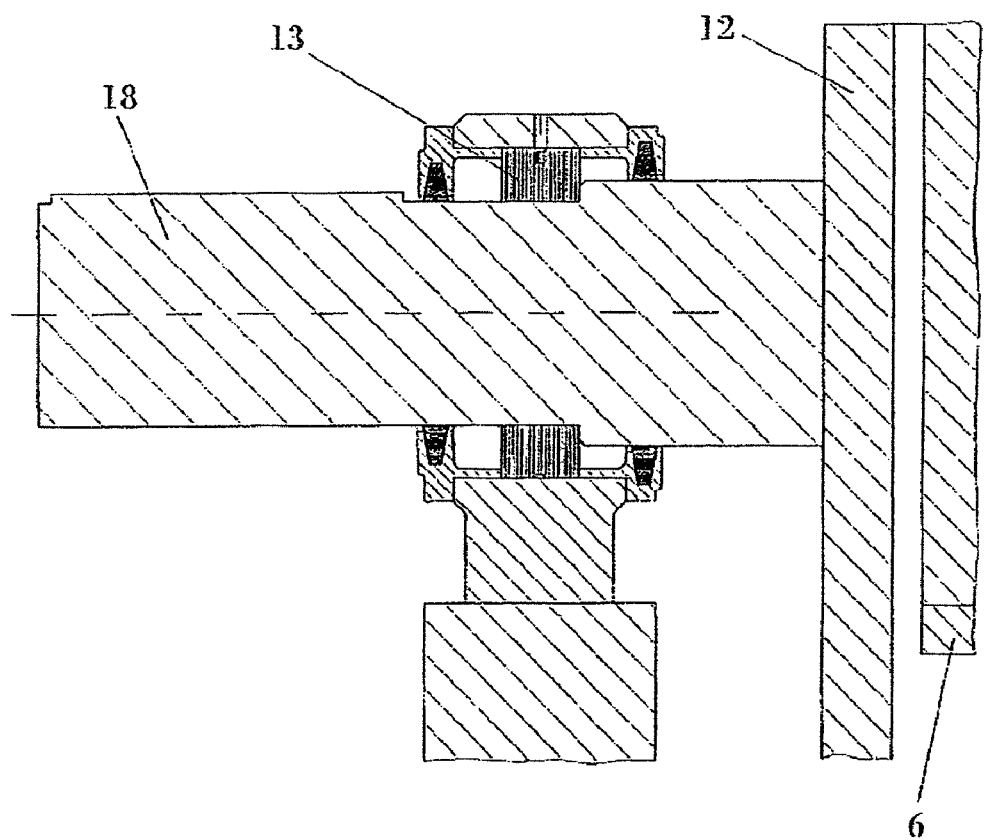
FIGS. 4D and 4E show corresponding details of the bearings and attachment components.
Figure 4E:
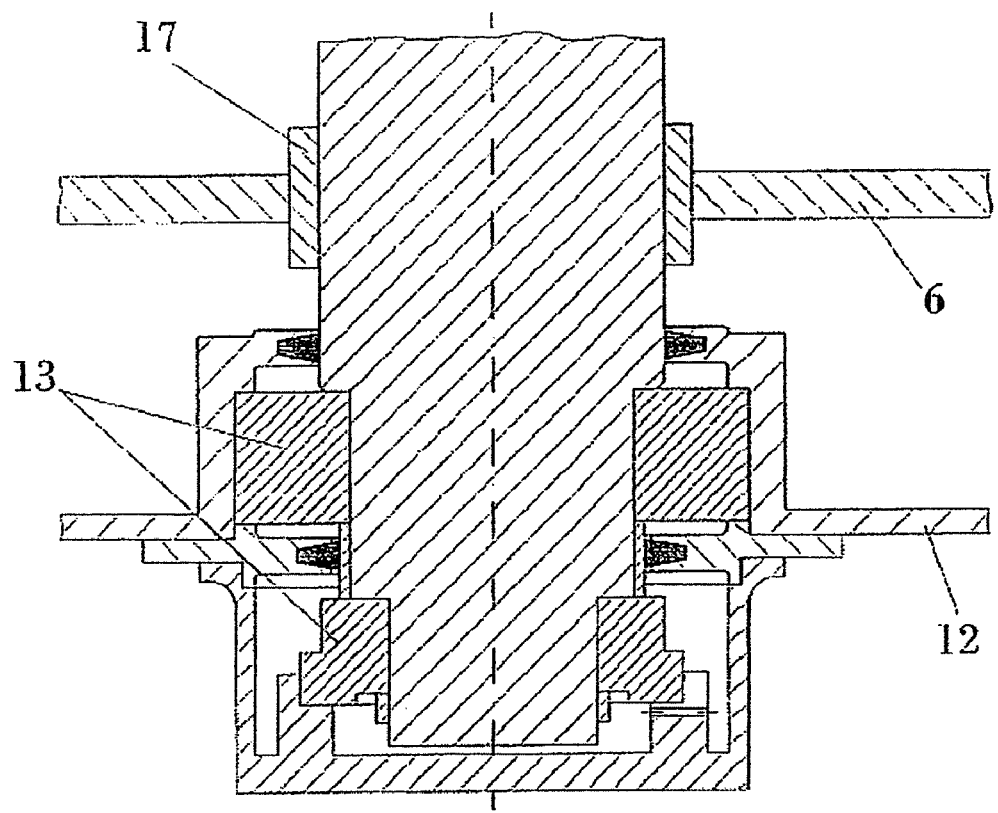
Figure 5A:
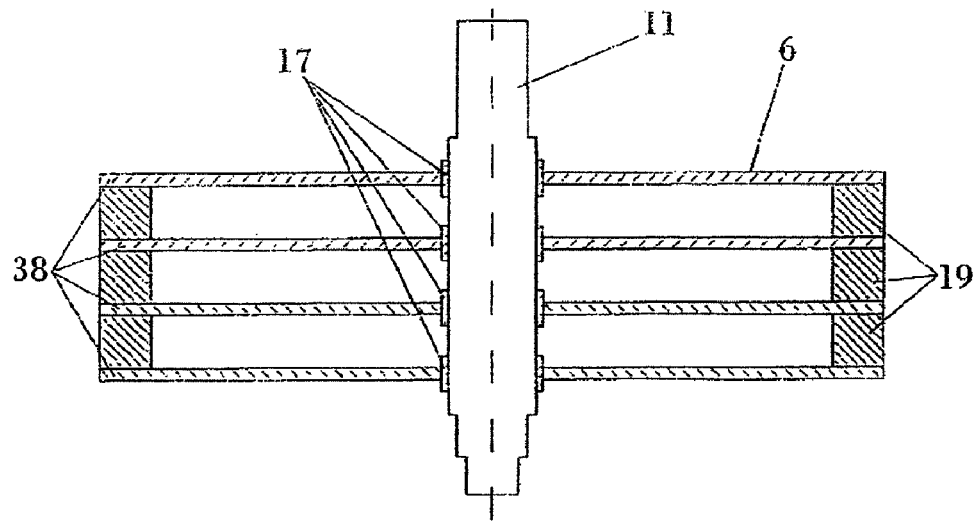
FIGS. 5A and 5B show two possible embodiments of the joining of the various parts from which the flywheel is made, according to an embodiment of the present invention.
Figure 5B:
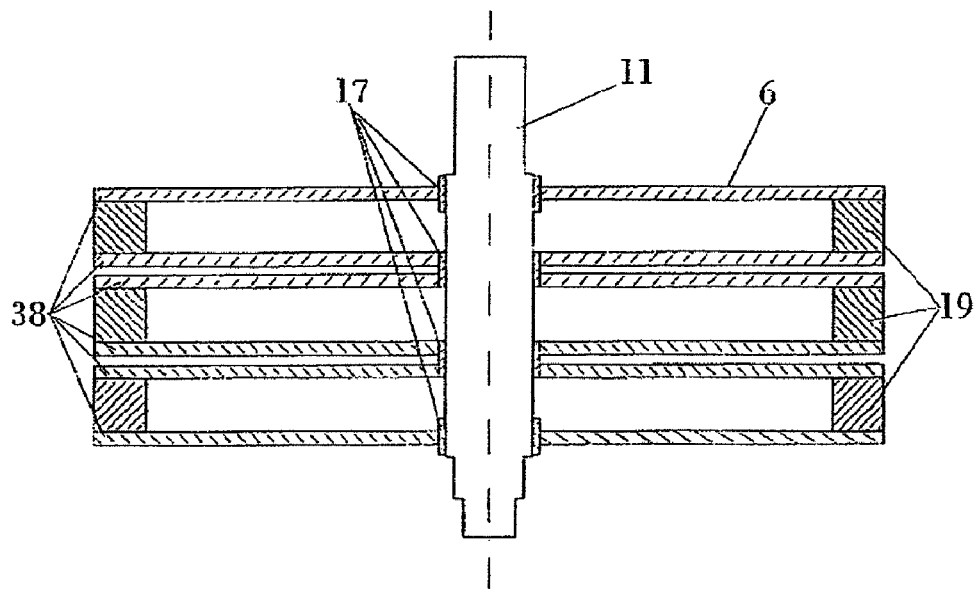

In addition, FIGS. 4D and 4E show corresponding details of the bearings (13) and the attachment components (17). The attachment components (17) are also shown in FIGS. 5A and 5B.

The flywheel (6) preferably has a thickness equal to or less than 2 meters. The flywheel (6) preferably has a cylindrical shape. The radius of the circumference that defines the base of the cylinder is selected to be equal to or less than 3 meters, and more preferably between 1.5 and 3 meters.

In addition, the selected profile for the flywheel (6) has a variable thickness, with a concentration of mass on the outside, such as a flywheel (6) with the shape of a cylinder. The profile is such that it allows maximising the angular moment to mass ratio. The angular moment, calculated as the product of the moment of inertia and the rotation angular velocity, must comply with the specifications or specific situation of the waves to obtain the desired energy. That is to say, the angular moment is related to the excitatory moment of the waves. Therefore, in very energetic sites an absorber with a greater moment of inertia or faster rotation speed, or several independent absorbers, must be used to obtain the desired energy. The flywheel (6) must adopt different configurations. Thus, it can be solid or hollow, formed by one or several rings or joined by one or two caps (38). The various parts comprising the flywheel (6) can be joined by a single cap between said parts or by manufacturing three mutually independent subsystems as shown in FIGS. 5A and 5B.

Other possibilities for joining the flywheels (6) are, for example, joining by plates on both the outer and inner surfaces of the flywheel.

Figure 6:
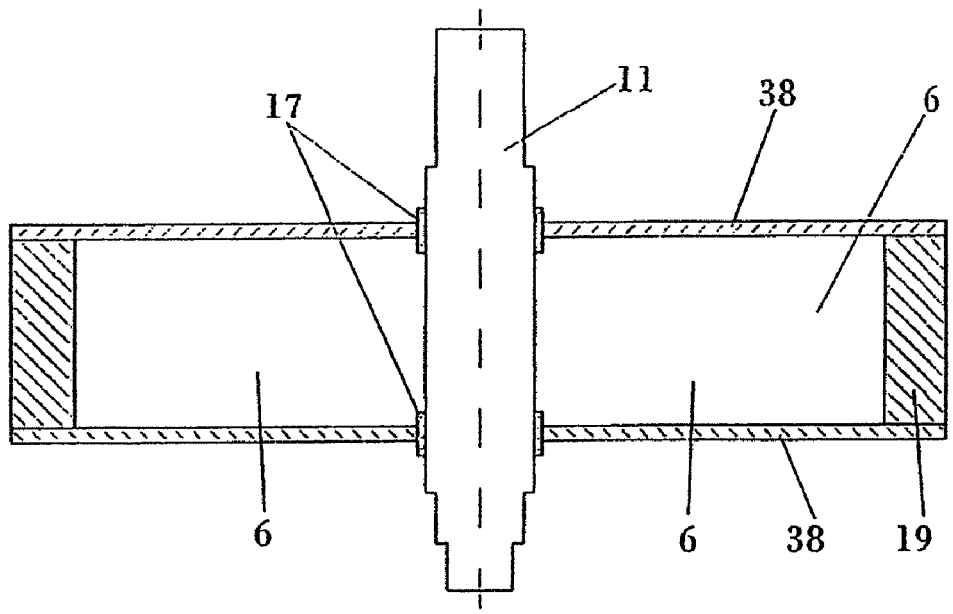
FIG. 6 shows an example of the shaft-flywheel attachments in a flywheel joined by two caps.

FIG. 6 shows an example of the shaft-flywheel attachments for a flywheel joined by two caps (38).

Figure 19:
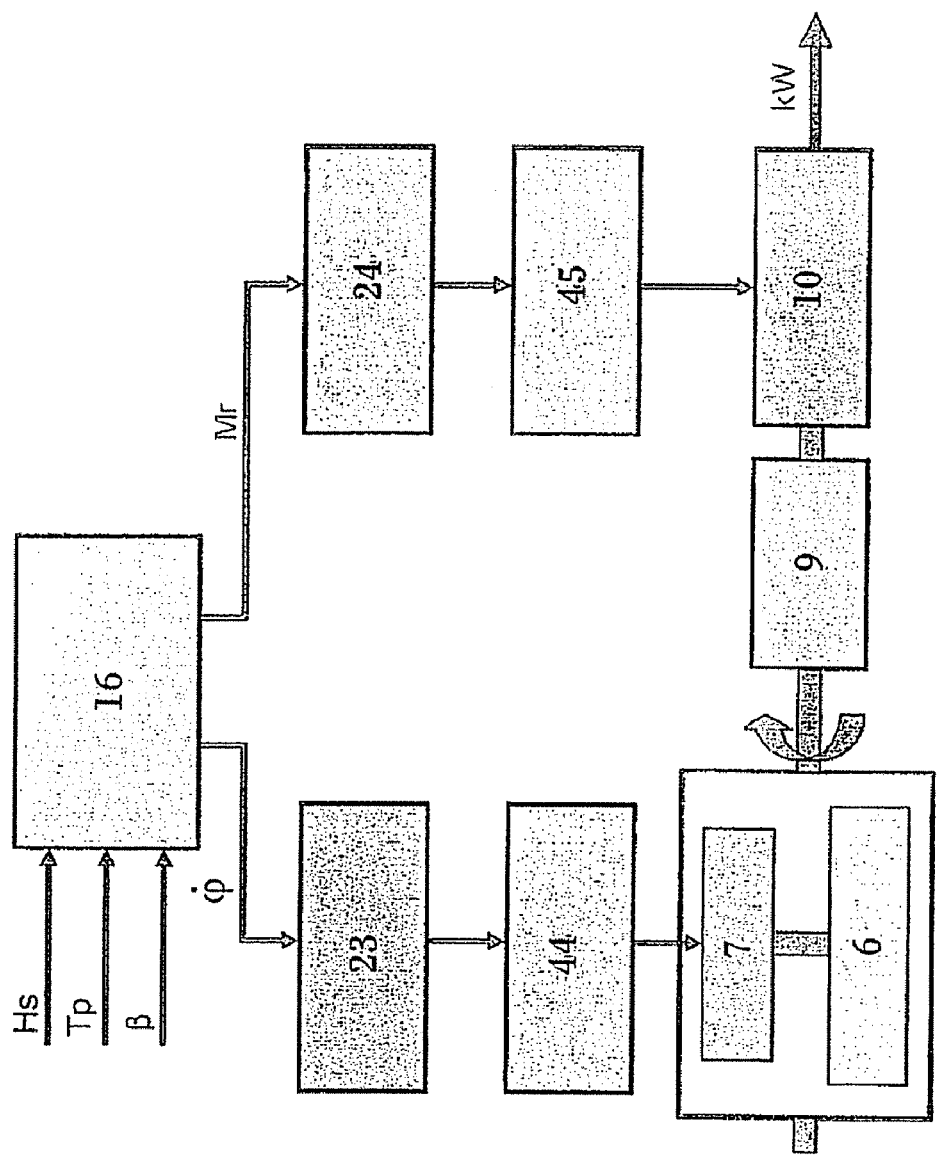
FIG. 19 represents a block diagram of the power generation control system.

As explained above, the flywheel (6) of the gyroscopic device (5) has a shaft in the Z-axis (11), as shown in FIGS. 3, 4A, 4B and 4C. The Z shaft (11) transmits the rotational motion to the flywheel (6) through the motor (7) joined to it. The angular velocity of the gyroscopic device is controlled by a control device (23) of the motor (7), which regulates a power converter (44) that controls the motor (7). This is shown in FIG. 19, described further below. The inputs used for the control device (23) of the motor (7) are: the desired rotation velocity value and the measurements of the rotation velocity and position of the motor. With this information, the current velocity and position values of the motor and the electric operation values, the motor control device (23) applies vector control calculus to obtain the control pulses injected into the power converter (44) that regulates the motor (7), so that the latter will have the desired angular velocity and moment. The torque transmitted by the motor (7) is higher at start-up; during continuous operation said torque overcomes the losses of the bearings (13), described further below, and venting losses, that is, losses due to friction of the flywheel with the wind or atmosphere. To reduce venting losses, the unit is introduced in a vacuum chamber (12). A non-limiting example, for illustration purposes only, is a 500 mbar (millibars) vacuum, which halves the venting losses.

The Z-shaft (11) supports the flywheel (6) and withstands the tensions resulting from the weight and pitching and oscillating motions of the assembly. The shaft may be made of steel, composite materials (metal matrix composites, ceramic matrix composites and organic matrix composites), aluminum or other suitable materials known in the state of the art or combinations thereof. The gyroscopic device (5) also comprises mechanical attachment components (17) such as conical attachment units, mechanical hydraulic-pressure joins, keys, bolts or any other joins known in the state of the art to join the flywheel (6) to the shaft (11) and the low-friction bearings (13) that reduce start-up and operation losses.

The bearings (13) support the Z-shaft (11) preferably at two support points on the ends of said shaft (11), although other configurations are possible. On the bottom part of the Z-shaft (11) are placed bearings (13) that support axial and radial loads, and on the top part of the shaft (11) are placed bearings (13) that support radial loads.

FIGS. 4A, 4B, 4C, 4E, 5A, 5B and 6 also show the shaft-flywheel attachment (17). This shaft-flywheel attachment (17) allows transmitting the motion of the Z-shaft (11) to the flywheel (6). The shaft-flywheel attachment (17) can be located in different places depending on the configuration of the flywheel (6). Thus, for a flywheel (6) formed for example by a ring with two caps, the attachments are placed in the two caps. FIG. 6 shows an example of the location of the shaft-flywheel attachments (17) in a flywheel (6) joined by two caps (38). The label (19) of FIGS. 5A, 5B and 6 indicates the crown of the flywheel (6).

The flywheel (6) is preferably fully encapsulated and protected inside the structure (1).

The outer structure or casing, hereinafter referred to as the casing, labelled in FIG. 3 with the number (8), which surrounds the flywheel (6), provides structural support to the shaft-flywheel-motor assembly.

It also guarantees a vacuum with respect to the outside (vacuum chamber). For this reason, in FIGS. 4A, 4B and 4C said casing (8) is represented as a vacuum chamber (12). In FIGS. 4A, 4B and 4C the gyroscopic device (5) is confined inside said low-pressure or vacuum chamber (12). The vacuum chamber (12) reduces losses due to air friction which increase with the cube $(\ )^3$ of the rotation speed and the fifth power $(\ )^5$ of the diameter. In addition, the vacuum chamber allows reducing the corrosion of the systems contained in it.

Figure 7:
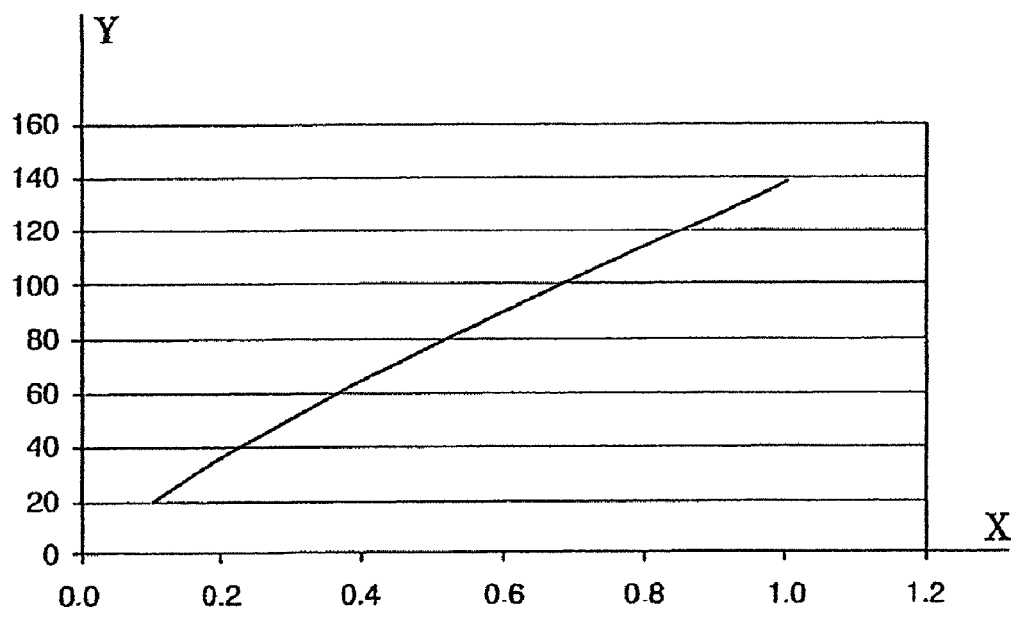
FIG. 7 shows a graph representing the variation of friction losses with atmospheric pressure inside the vacuum chamber.

FIG. 7 shows a graph representing the result of numerical simulations made to study the variation of frictional losses as atmospheric pressure increases in the vacuum chamber (12). The x-axis represents the pressure in bars (bar), while the y-axis represents frictional losses in kilowatts (kW). As can be seen, frictional losses increase with atmospheric pressure. Therefore, reducing the pressure inside the chamber (12) will reduce frictional losses proportionally.

As stated above, the casing (8) acts as a vacuum chamber (12) to prevent venting losses. A vacuum system is used to reach depressions of 70 mbar to 500 mbar. The vacuum chamber (12) provides a sealed or insulated interior that prevents losses for maintaining the vacuum.

In addition, in case of accidental breaking of the flywheel (6), the casing (8) or vacuum chamber (12) protects the converter system assembly. The casing also protects against an undesired catastrophic failure that could affect external components. An example of catastrophic failure includes the worst-case scenario: the floating structure (1) breaking and the converter sinking.

A possible configuration of the casing (8) or vacuum chamber (12) according to an embodiment of the present invention comprises a central cylindrical body with two caps placed on either end. The supports of the shaft (11) on which the flywheel (6) is mounted are placed on both caps. The longitudinal X-shaft (18) of the flywheel (6), after passing through the vacuum chamber (12), is connected to a generator (10) by a preferably mechanical coupling.

The flywheel-casing system is mounted on the X-shaft or casing shaft (18). This shaft supports loads due to the weight of the assembly. It is also subjected to fluctuating loads due to the pitch and roll motions.

The casing material can be steel, composite materials (metallic matrix, ceramic matrix and organic matrix composites), ceramic materials, aluminum, magnesium, titanium or, alternatively, it can be made of layers of said materials or from other suitable materials known in the state of the art, and mixtures thereof.

The bearings (13) of the casing X-shaft (18) support the casing and withstand its rolling motion, the loads due to the assembly pitching motion and axial loads. Preferably, the bearings (13) are self-aligning as, due to the great length of the shaft, misalignments are likely. Self-aligning bearings (13) are known commercially. Examples of self-aligning bearings (13) are roller bearings or roller to ball bearings.

The difference between FIGS. 4A, 4B and 4C is in the position of the motor (7): in one embodiment of the invention the motor (7) is placed under the flywheel (6), which favours housing and lubrication of the bearings (13); in another possible embodiment of the present invention, the motor (7) is placed after the bearings (13). In this second case, the shaft (11) is shorter, so that the assembly is more rigid. Lastly, in a third embodiment of the present invention the motor (7) is placed on the top part of the flywheel (6), which increases the lifetime of the motor as it is protected from the rest of the assembly.

Figure 8A:
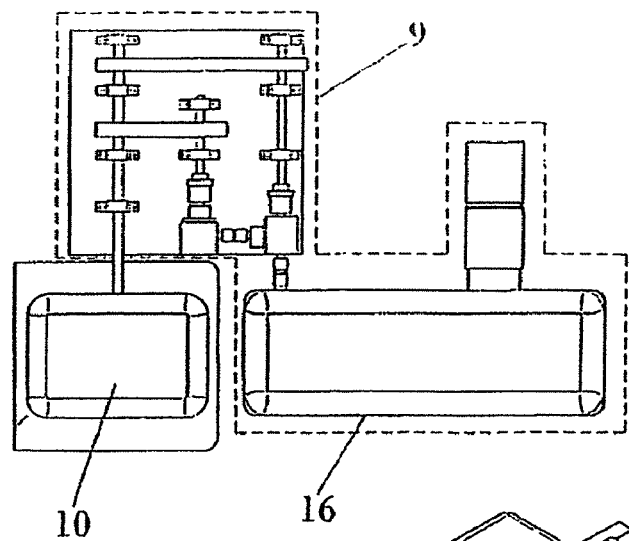
FIGS. 8A, 8B and 8C show different views of the mechanical coupling according to an embodiment of the present invention.
Figure 8B:
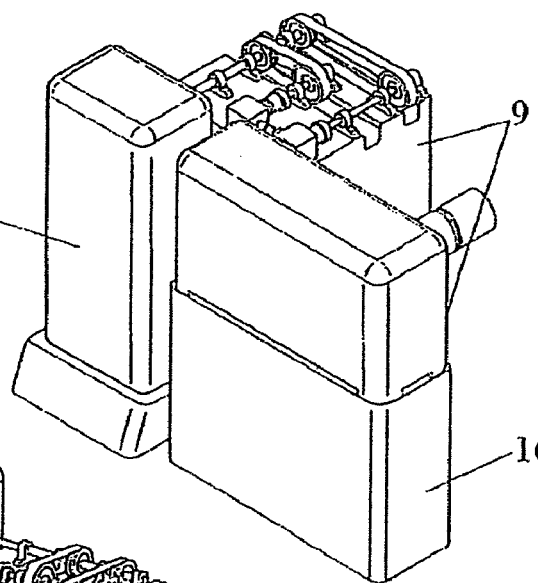
Figure 8C:
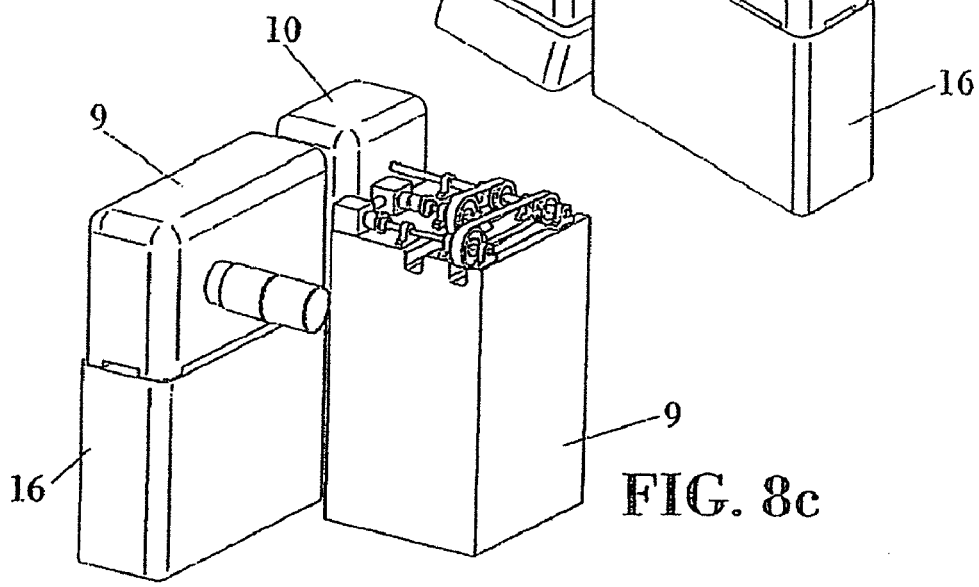

As explained above, the oscillatory motion ($\dot{\Psi}$) obtained from the gyroscopic device (5) is transformed into a continuous rotation ($\dot{\Psi}''$) in a single sense (unidirectional rotation) by a coupling (9), preferably mechanical, designed to harness the energy of waves. The mechanical coupling (9) shown in FIGS. 3, 8A, 8B and 8C comprises a multiplicator system with gears, free wheels and idlers, as shown in FIGS. 8A, 8B and 8C. After obtaining the unidirectional rotation ($\dot{\Psi}''$), as shown in FIG. 3, it is used to drive a rotating generator (10), as shown in FIGS. 3 and 8. The rotating generator (10) can be any conventional rotating generator, such as a conventional electrical rotating generator, preferably with permanent magnets. The low frequency rotation is conditioned to the working regime of the rotating generator (10) after one or several multiplication stages through the coupling (9), preferably mechanical coupling (9). The control of the resistance torque offered by the rotating generator, preferably with permanent magnets, connected to the mechanical coupling (9) at the output of the gyroscopic device is obtained by a control device (24) of the generator (10), which regulates the power converter (45) that controls the generator (10). This control device (24) is in charge of changing the resistance torque of the generator (10). The inputs of said control device (24) of the generator (10) are: the desired value for the resistance torque (Mr) and the measurements of the rotation velocity and position of the generator. With this information and the current velocity and position values of the generator and the electric operation values, the generator control device (24) applies vector control calculus to obtain the control pulses injected to the power converter that regulates the generator (10), so that it will attain the desired resistance torque. This is shown in FIG. 19.

Alternatively, in specific embodiments a hydraulic, pneumatic coupling or direct transformation into electrical power is used. If hydraulic/pneumatic couplings are used, the oscillatory motion is used to compress a fluid that is accumulated in a pressurised tank and later released, turning the generator. If direct transformation into electrical power is used, a linear generator is used, so that no intermediate transformation is required.

An auxiliary power source (not shown in the figures), charged with part of the energy produced by the converter or by another renewable power source (such as but not limited to photovoltaic panels on the floating structure (1)), allows maintaining the flywheel (6) in motion and feeding the remaining systems of the energy converter.

Lastly, the gyroscopic device (5) is firmly joined to the external part of the floating structure (1) through a support (15) as shown in FIGS. 4A, 4B and 4C.

Figure 21:
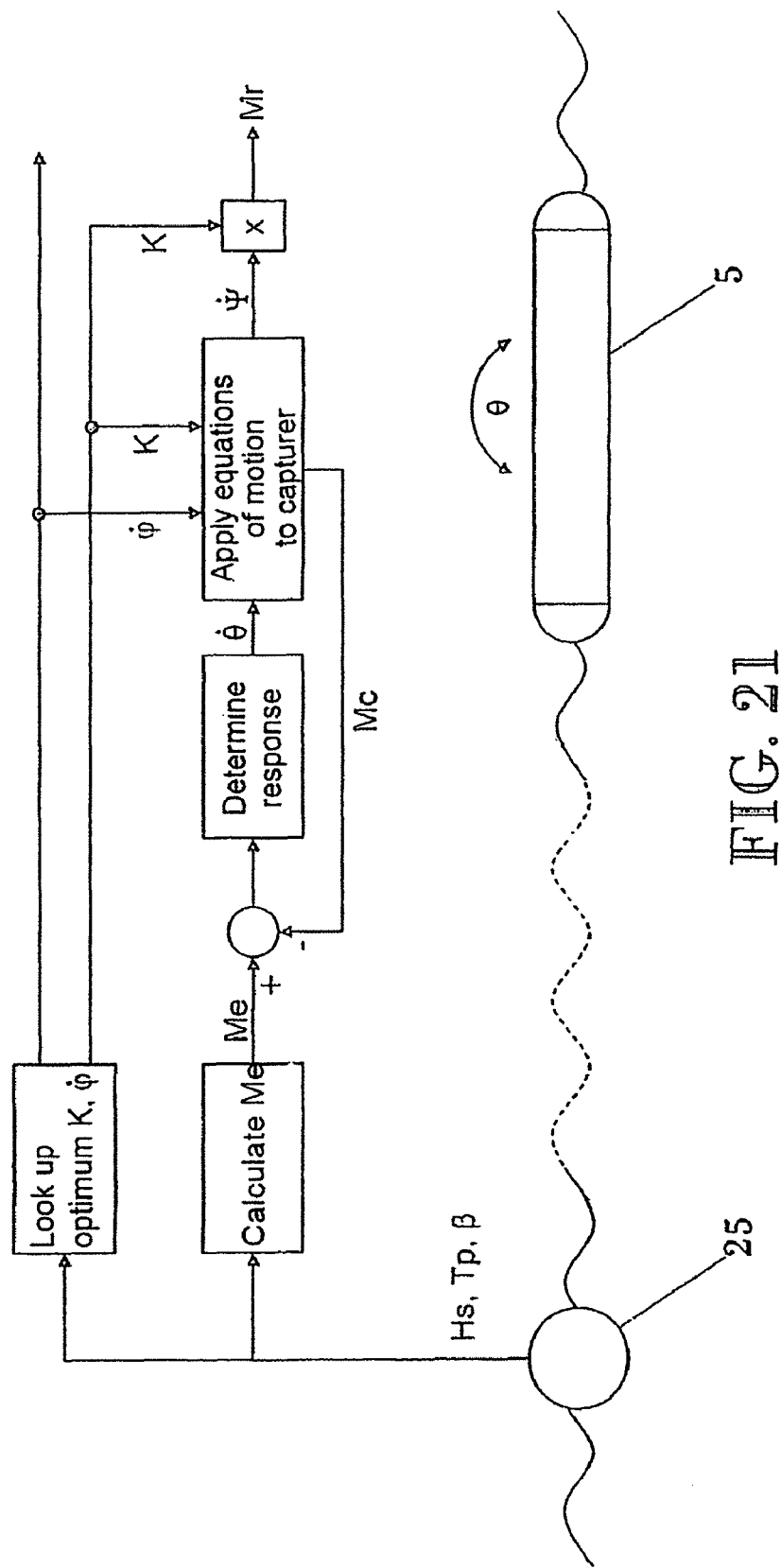
FIG. 21 shows a block diagram of the procedure used to determine the control variables for the power conversion system.

FIGS. 8A, 8B and 8C also show a control unit (16). In addition, FIG. 19 shows this control unit (16), a control device (23) of the motor and a control device (24) of the generator. These control devices (16, 23 and 24), preferably placed on the floating structure (1), allow adapting the operation parameters of the converter to the changing wave conditions, mainly significant height (Hs), period (Tp) and direction of travel (β). Thus, FIG. 19 shows that these three parameters (Hs, Tp, β) are represented in FIG. 19 as input parameters of the control unit (16). The blocks (44) and (45) represent power converters whose output is the input of the motor (7), which in turn is connected to the flywheel (6), and to the generator (10), respectively. FIG. 19 also shows the coupling (9), preferably mechanical, described above. To optimise performance, it is best to define the energy contained in each frequency band of the waves (power spectrum) and adjust the operation of the energy converter system to the most energetic frequency. This is shown in FIG. 21, which represents a block diagram of the procedure used to determine the control variables of the energy converter system. The period corresponding to this frequency is the peak period (Tp). Other parameters, such as the average period (Tz) or the energy period (Te) may not give an accurate representation of the state of the sea analysed. In this way the wave energy is best used. These converter operation parameters are acquired using a measurement buoy (25) described further below. Acting on the speed of rotation ($\dot{\phi}$) of the flywheel (6) and the resistance torque of the generator (10) allows maintaining the gyroscopic device (5) in phase with the waves, so that the energy use is maximum. Based on the significant height (Hs), the peak period (Tp) and the direction of travel (β), the converter control unit (16) obtains the values of the optimum resistance torque ($M_r=N_\psi$) and optimum rotation speed ($\dot{\phi}$) of the gyroscopic device. These values are extracted from two tables, the resistance torque and gyroscopic device tables, stored in the memory of the converter control unit (16).

As shown in FIG. 21, the measurement buoy (25) records the wave parameters: preferably significant height (Hs), wave peak period (Tp) and direction of travel (β). Although the buoy (25) preferably measures and records all three parameters (Hs, Tp and β), in specific embodiments of the invention the buoy (25) records only two parameters, namely the significant height (Hs) and the peak period (Tp). In addition, in specific embodiments of the invention the buoy (25) records the average wave period instead of the peak period.

The magnitude of the excitatory moment (Me) depends on the wave parameters and the geometry of the energy converter, this is, its hydrodynamic performance in the sea. It is calculated according to classical fluid mechanics and the results are validated in a hydrodynamic testing channel. The general expression of the differential equation that defines the pitching behaviour of the structure subjected to the effect of waves is the following:

$$A\cdot\ddot{\theta}+B\cdot\dot{\theta}+C\cdot\theta=Me$$

where:

θ, $\dot{\theta}$ and $\ddot{\theta}$: the converter pitching motion, velocity (or speed) and acceleration respectively;
A: pitching inertia coefficient;
B: pitching damping coefficient;
C: pitching restoration coefficient;
Me: excitatory moment.

The converter response, this is, the pitching speed ($\dot{\theta}$), is obtained by solving this differential equation by numerical methods.

The motion of the gyroscopic device or absorber is defined according to classical mechanics by the following two differential equations:

$$\ddot{\psi} = \frac{K\dot{\psi}}{I_v} + \dot{\theta}^2 sen\psi cos\psi + 2\dot{\phi}\dot{\theta}cos\psi$$

$$M_c = \left(\ddot{\theta} - \frac{2\dot{\phi}\dot{\psi}}{cos\psi}\right)I_v$$

where:

ψ, $\dot{\psi}$ and $\ddot{\psi}$: respectively the rolling motion, velocity (or speed) and acceleration of the gyroscopic device or absorber.
$I_v$: Moment of inertia of the gyroscopic device or absorber with respect to the z axis.
K: Resistance torque constant.
$\dot{\phi}$: Rotational angular velocity of the gyroscopic device or capturer.
Mc: Stabilising moment introduced by the gyroscopic device or capturer (on the same plane and opposite to Me).

These equations provide the rolling velocity of the gyroscopic device or capturer ($\dot{\psi}$) and the stabilising moment (Mc) by entering the values of the resistance torque constant (K) and the rotation angular velocity of the gyroscopic device or ($\dot{\phi}$). The stabilising moment (Mc) is compared to the excitatory moment (Me) and used to modify the pitching response of the converter.

The rotation angular velocity of the gyroscopic device or capturer ($\dot{\phi}$) and the resistance torque ($M_r=K\dot{\psi}$) are the values sent to the control devices (23, 24) of the motor and generator respectively. Note that $M_r=N_\psi$.

The optimum values of the resistance torque constant (K) and the rotation angular velocity of the gyroscopic device or capturer ($\dot{\phi}$) are functions of the significant height (Hs) and peak period (Tp). These values are calculated once and stored in a table in the control device of the absorber for consultation.

These values are determined by iteration for each pair (Hs, Tp) with the aid of the aforementioned differential equations. The initial values ($K_0$ and $\dot{\phi}_o$) used are those used to calculate the value of the initial resistance torque ($Mr_0$). Then the values of K and $\dot{\phi}$ are increased respectively ($K_{i+1}=K_1+\Delta K$; $\dot{\phi}_{i+1}=\dot{\phi}_i+\Delta\dot{\phi}$). The value of the resistance torque is recalculated ($Mr_{i+1}$) and compared to the previous value ($Mr_i$). This process is repeated until $Mr_{i+1}$ is less than $Mr_i$. The optimum values are then $K_i$ and $\dot{\phi}_i$.

Figure 9:
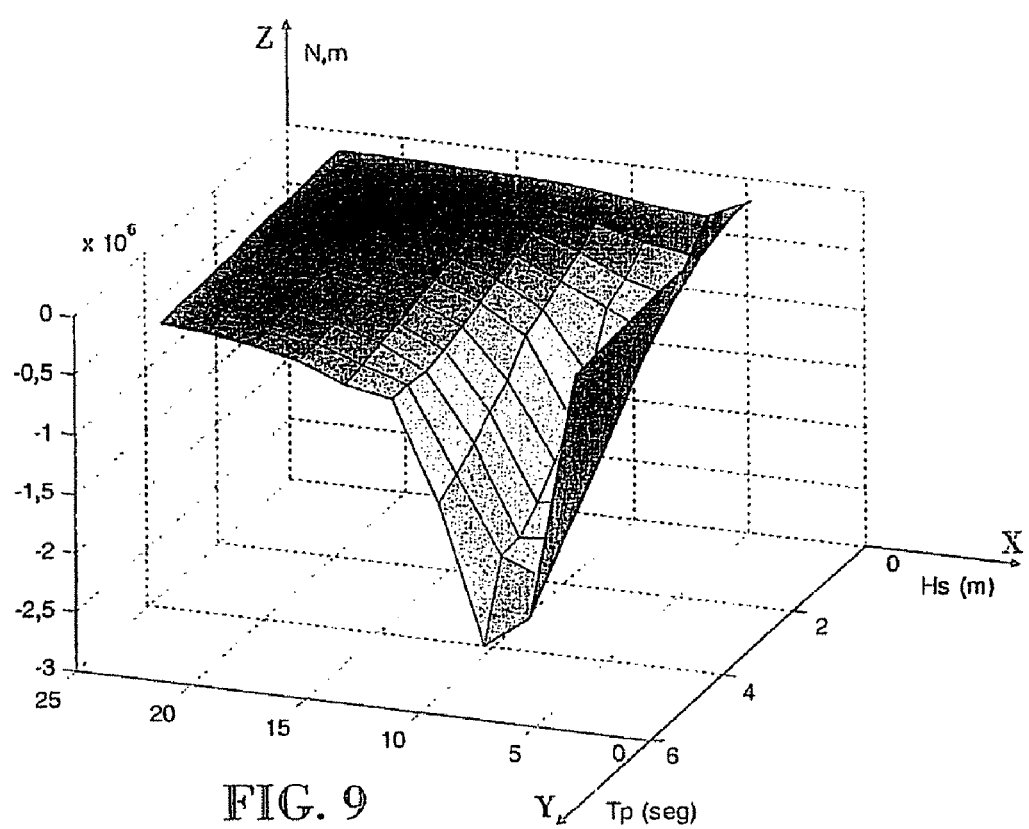
FIG. 9 shows a graph representing the resistance torque applied by the generator as a function of the wave period and wave height.

The resistance torque applied by the generator (10) depends mainly on the wave period (Tp) and wave height (Hs). This is represented in FIG. 9, which shows the simulations of solutions of the second-order differential equations. FIG. 9 represents the resistance torque of the generator (expressed in Newtons×meter (N×m)) with respect to the wave height Hs (on the Y axis, in meters) and wave period Tp (in the X-axis, in seconds).

Figure 10:
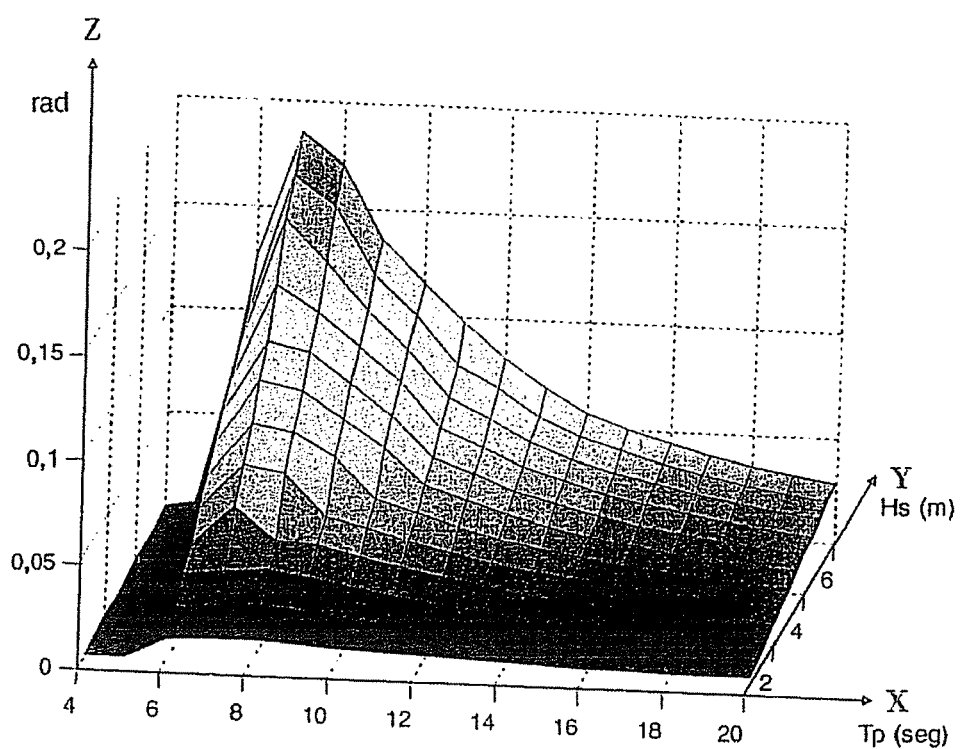
FIG. 10 shows a graph representing the pitch angle as a function of the wave period and wave height.

The resistance torque is maximised with the increased pitch angle (θ). These simulations are shown in FIG. 10. FIG. 10 shows a graph representing the pitch angle (in radians) as a function of the wave period (Tp) (s) and wave height (Hs) (m).

Figure 11:
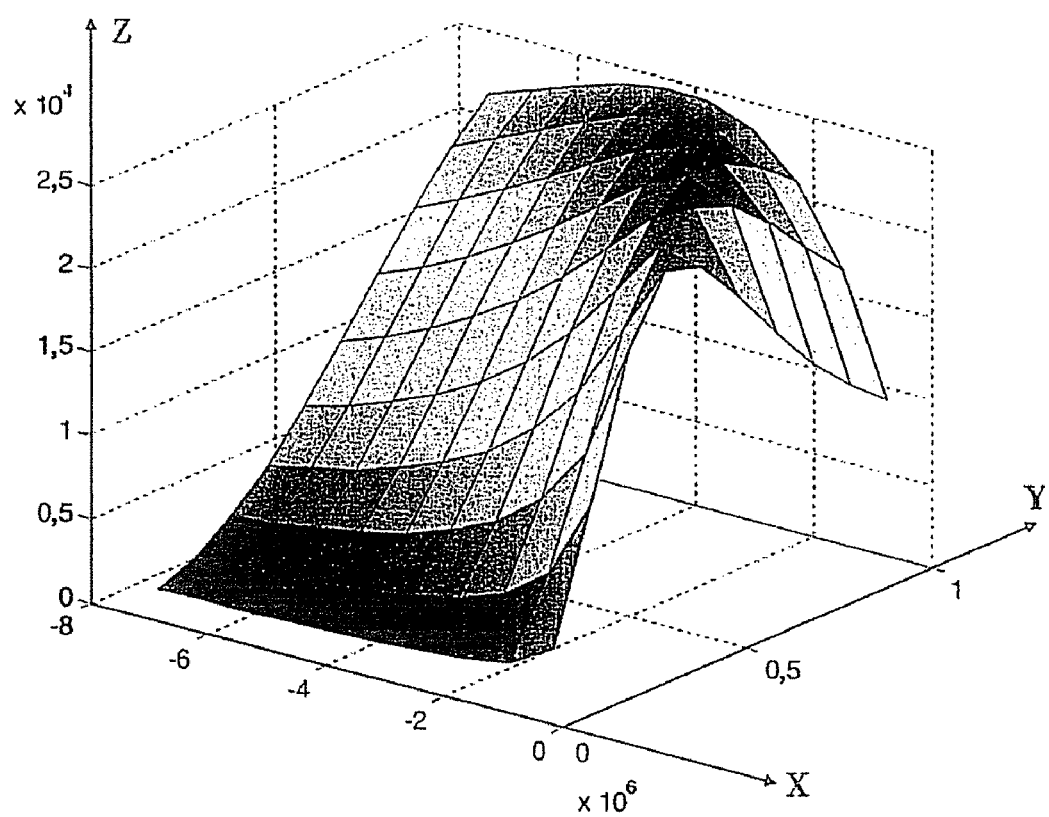
FIG. 11 shows a graph representing the power obtained as a function of the resistance torque applied and the rotation speed of the flywheel.

The maximum power is obtained for an angular motion associated to a rotation speed of the flywheel (6). FIG. 11 shows a graph representing the results of numerical simulations made to study the variation of the power (in Watts W, Z-axis) obtained as a function of the resistance torque applied (X-axis), in Newtons×meter, and the rotation velocity ($\dot{\phi}$, Y-axis) of the flywheel (6) for a given wave height Hs and wave period Tp. Although the rotation velocity is expressed in rad/s, in FIG. 11 it is given as a percentage % variation of the maximum velocity supported by the material used to manufacture the flywheel.

The control of the rotation velocity of the flywheel (6) allows adjusting the velocity of the gyroscopic device (5) to that corresponding to an optimum angular moment. FIG. 12 shows a table representing the result of numerical simulations made to study the variation of the rotation velocity of the gyroscope with wave height (Hs) (in meters) and wave peak period (Tp) (in seconds).

As explained above, the system or installation for harnessing energy or energy converter system also comprises a buoy or floating device (25) for capturing data or measurement. This measurement buoy (25) can be any commercial measurement buoy, such as those marketed by Seawatch®, Wavescan®, Waverider® or Triaxys®. The measurement buoy (25) records the wave parameters: preferably significant height (Hs), peak period (Tp) and direction of travel (β). The measurement buoy (25) is placed near the wave energy harnessing system to ensure a similar exposure to the waves and consider local effects of wave interaction with the sea base or the coastline. The maximum distance can be 5 to 10 Km approximately.

The wave data are sent regularly to the energy converter system, and more specifically to the control unit (16), by a wireless transmission/reception unit described further below. The wave height (Hs), period, preferably peak period (Tp) and direction of travel (β) values are obtained by measurement or estimation. The data measured for the surroundings of the Bilbao Port are shown further below. Depending on the height (Hs) and peak period (Tp) in each moment the control unit (16) will select the maximum value (K) of the resistance torque (Mr, $N_\psi$) that must be applied in the X-axis shaft (18) of the gyroscopic device (5). The values of Hs and Tp are related to each other by the distributions for a specific site (such as the data included for the Bilbao Port). The resistance torque (Mr, $N_\psi$) is applied to the X-axis shaft (18) with the generator (10), which is controlled by a power converter (45). The resistance torque value is sent to the power converter (45) by the generator control device (24), which sets the maximum torque value required in each rolling cycle and applies a torque proportional to the rolling speed at each moment $N_\psi=K\cdot\psi$. The Hs and Tp parameters are related to the constant K through graphs similar to that shown in FIG. 11.

It is essential to act upon the X-axis shaft (18) of the gyroscopic device (5) changing the torque for two reasons:

On one hand, a torque value that is too low would lead to an unstable behaviour of the gyroscopic device (5) that would make it impossible to obtain power. A torque value that is too high would lead to a sub-optimal or insufficient yield (if it is too far from the maximum value).

On the other hand, the wave data (height and period) are used to select the optimum rotation speed ($\dot{\phi}$) to apply to the Z-axis shaft (11) of the gyroscopic device (5). This value is sent to a motor (7) through the control device (23) of the rotation velocity of the gyroscopic device (5) that turns the Z-axis shaft (11) connected to the flywheel (6) of the gyroscopic device (5).

The action on the Z-axis shaft (11) is performed more slowly, as wave conditions can remain stable for several hours.

The action on the Z-axis shaft (11) of the gyroscopic device (5) by a motor (7) is also required for the following:

Starting up the capturing system when wave conditions allow generating power: operation mode.

Braking the flywheel (6) to protect the mechanisms of the gyroscopic device (5) in situations of extreme wave conditions (storm): survival mode.

Attaining the rotation velocity that allows generating maximum power: maximum power generation mode.

The transmission/reception system is preferably wireless and is used to transmit the data captured by the measurement buoy (25) to the control unit (16), where they are processed. The wireless transmission/reception system comprises a transmitter placed in the measurement buoy and a receiver placed in the non-submerged part of the structure and connected to the control unit (both supplied by the aforementioned commercial measurement buoys). The data are preferably sent via radio, ensuring coverage at sea of up to 50 km, much greater than the distance between the measurement buoy and the converter. The wireless transmission/reception system is conventional.

The control unit (16) allows both long and short term actions. In the first case, the control unit (16) controls general operation conditions by weather forecasting models (24-48 hours). In the second case a fine control is performed by sensing the instantaneous height (Hs), peak wave period (Tp) and direction of travel (β) values, employing Fourier analysis techniques to determine the ideal operation conditions.

The wave forecasting models consist of generation and propagation models coupled to meteorological models, and more specifically to the wind field outputs generated by these. In the Bay of Biscay, as most of the wave energy received is generated in the North Atlantic the waves can take 24 to 48 hours to arrive at the coast after they are generated, so that the forecast is generally much greater than that provided by the meteorological model. Forecasts for local wave conditions are less reliable due to the scale and their direct dependence on the wind forecasts for the area: even so, in recent years meteorological forecasts have reached a very high reliability within the 48-hour horizon.

Therefore, based on the outputs of certain agencies, such as the FNMOC or NOA, or locally the INM (Instituto Nacional de Meteorologí a) or Euskalmet, it is possible to obtain the main wave characteristics for the following hours or, with lower reliability, even 3-4 days in advance.

Spectral analysis is important when approaching an analysis of sea conditions. A wave by wave description becomes a description in which the waves are considered as a random perturbation of the free surface around an average level, with certain predetermined or known distribution characteristics. This approach allows employing signal analysis theory with all the accompanying Fourier analysis mathematical tools.

The wave spectrum can be defined with reasonable rigour as the distribution of the energy associated to the wave (actually the power) with the frequency. However, the formal definition of the wave spectrum is the Fourier transform of the autocovariance function of the free surface elevation. As the free surface sampling is not continuous, readings being taken with a certain frequency (sampling period) it is not possible to apply the continuous Fourier transform; instead, the finite Fourier transform (FFT) must be used.

Thus, by grouping the waves in the record by directions and applying the Fourier transform to each group a distribution can be obtained of the wave energy measured, in directions and frequencies. Then the absorber characteristics are adjusted for maximum efficiency.

Finally, the electric energy generated by the converter system is transported to land for integration in the grid by a submarine cable. Alternatively, the energy can be stored in the form of another energy vector (such as, but not limited to, hydrogen, compressed air or pressurised water) or it can be used directly to desalinise water (such as by reverse osmosis).

Several parameters of the floating structure (1) of the installation have been optimised for harnessing wave energy according to the present invention.

On one hand, the alignment of the floating structure (1) with the direction of travel of the waves is achieved by a mooring system that described further below. Optionally, this alignment is also obtained by a corrective device.

FIG. 2, described above, shows a floating structure (1) preferably with an elongated shape as said shape depends on the optimisation of a number of parameters described below. The size of the floating structure (1) must be such that it is adapted to the most frequent characteristics of the waves at the installation site. FIG. 2 shows the length (20) and breadth (21) of the floating structure (1). For each sea condition (that is, the combination of the wave height Hs and period Tp) there is a length (20) of the floating structure (1) that maximises the energy produced. To each potential site of the floating structure (1) corresponds a specific wave height and period swatter diagram. That is, the same combinations of wave height and period have a different likelihood in two different sites. This implies that each site has a predominant wave height and period.

By way of example, FIG. 14 shows a table representing the wave height and period scatter diagram characteristic of the surroundings of the Bilbao Port, with respect to the peak period (Tp), in seconds, and the significant height (Hs), in meters. In this case the predominant period is 12 s and the predominant height is 1.5 m.

Figure 13:
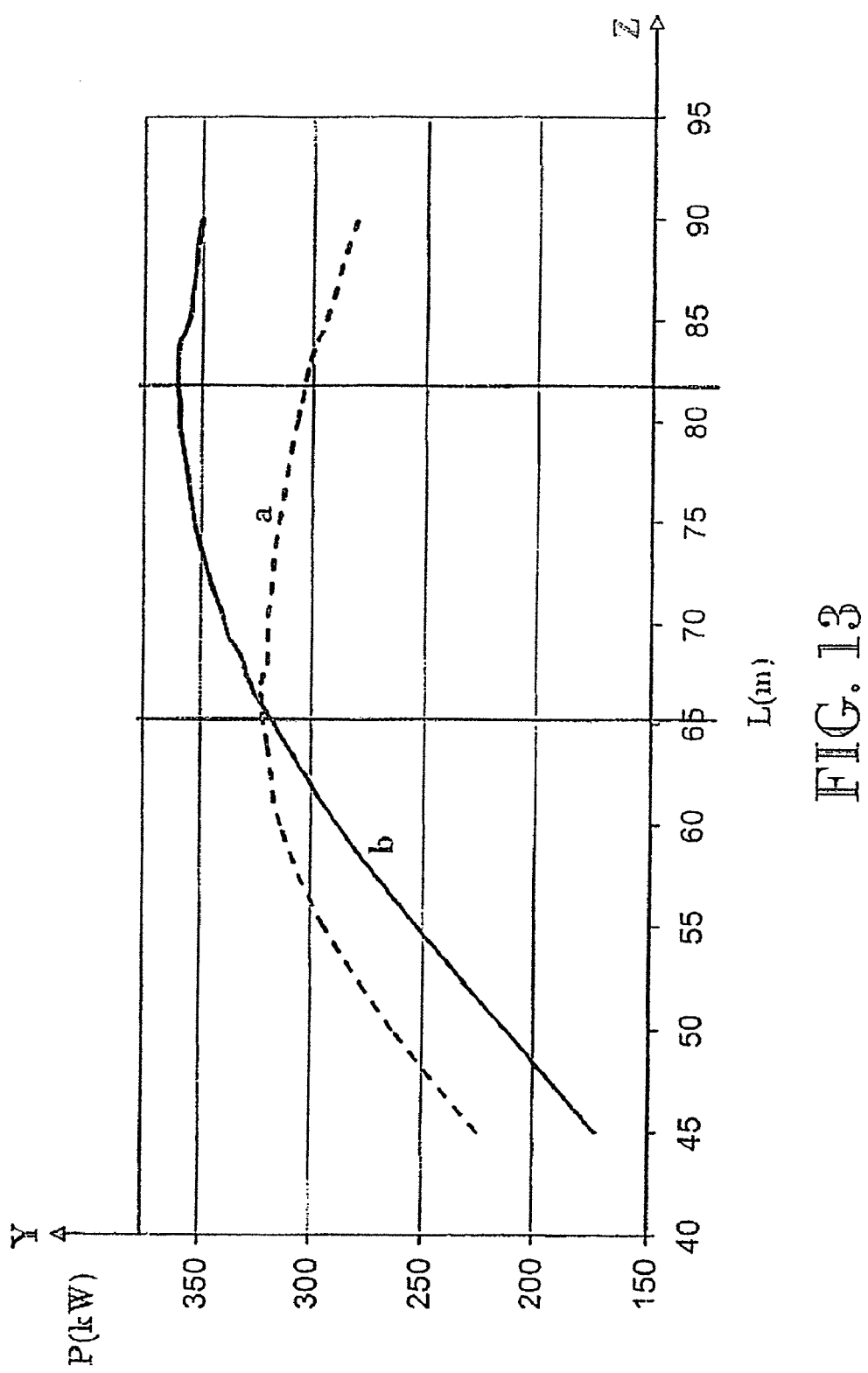
FIG. 13 shows a graph representing the optimum length of the floating structure as a function of the wave period.

For each scatter diagram there is a length (20) that maximises the energy produced by the energy converter system. The length (20) is directly related to the period of the predominant sea conditions. FIG. 13 shows a graph representing the result of numerical simulations made to calculate the optimum length, that is, the one that maximises the energy produced by the energy converter system, and its relation to the wave wavelength, for two different values of the wave peak period ("a", Tp=6.3 s; "b", Tp=7.3 s). The X-axis represents the length L in meters and the Y-axis represents the average power in kilowatts (kW). For the scatter diagrams studied, as shown in the graph in FIG. 13, the optimum length has a value approaching but not exceeding the predominant wavelength, which depends on the peak period according to the formula $\lambda=1.56 \cdot T^2$.

The floating structure (1), particularly its outer shape, is designed to maximise pitching due to the waves and provide a low structural damping so that the efficiency of the energy capturer is maximised. For a constant value of the draught of the floating structure (1), the area of the submerged part increases with the breadth or length (21). However, the effective capturing breadth increases to a lower extent. Therefore, to maximise the energy obtained per unit volume the structure must be as thin or elongated as possible. The term "thin" must be understood in the present description as having a low breadth/length (B/L) ratio.

After determining the optimum length for a specific site, the breadth/draught ratio is selected to maximise the energy obtained per unit volume, provided it allows housing all absorber components inside it.

In addition, the floating structure (1) must have a sufficiently large draught to minimise wind effects and thereby orientating itself in the direction of travel of the waves.

Figure 15:
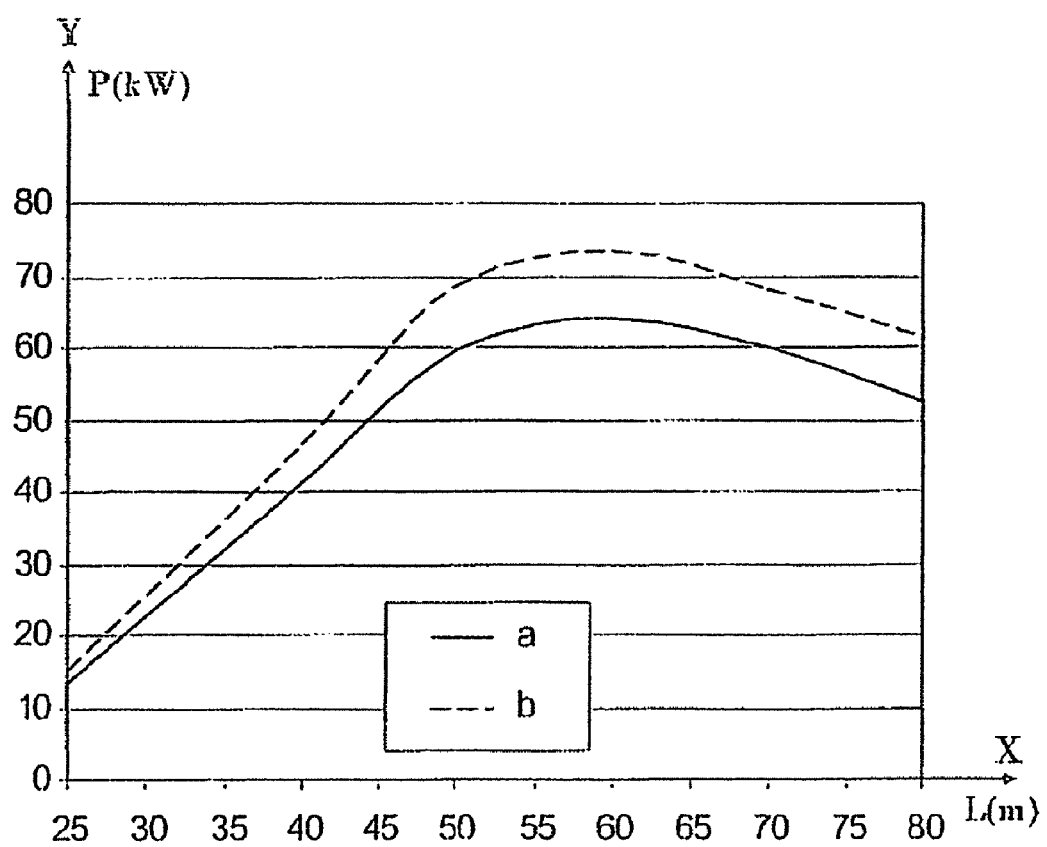
FIG. 15 shows a graph representing the power obtained as a function of the longitudinal inertia.

The optimum floatability that gives the floating structure (1) a suitable hydrodynamic stability is obtained by adding ballast (22), as shown in FIG. 2. The ballast (22) is not distributed uniformly but instead is placed on the ends of the structure (1) to increase the longitudinal inertia of the floating structure (1). FIG. 15 shows a graph representing the result of numerical simulations made to study the effect of longitudinal inertia on power generated. The graph of FIG. 15 shows average power in kilowatts (kW) (Y axis) vs. length in meters (X axis), for two energy converter systems with 100% (a) and 170% (b) of the longitudinal inertia corresponding to a uniform mass distribution. It can be seen that increasing the longitudinal inertia increases the power generated, as shown by the simulations made. That is, increasing the longitudinal inertia improves the energy efficiency of the energy converter system.

As regards the breadth (21) of the structure, its lower limit is determined by the volume of the gyroscopic device (5), which is housed inside the converter or on its surface.

Figure 16:
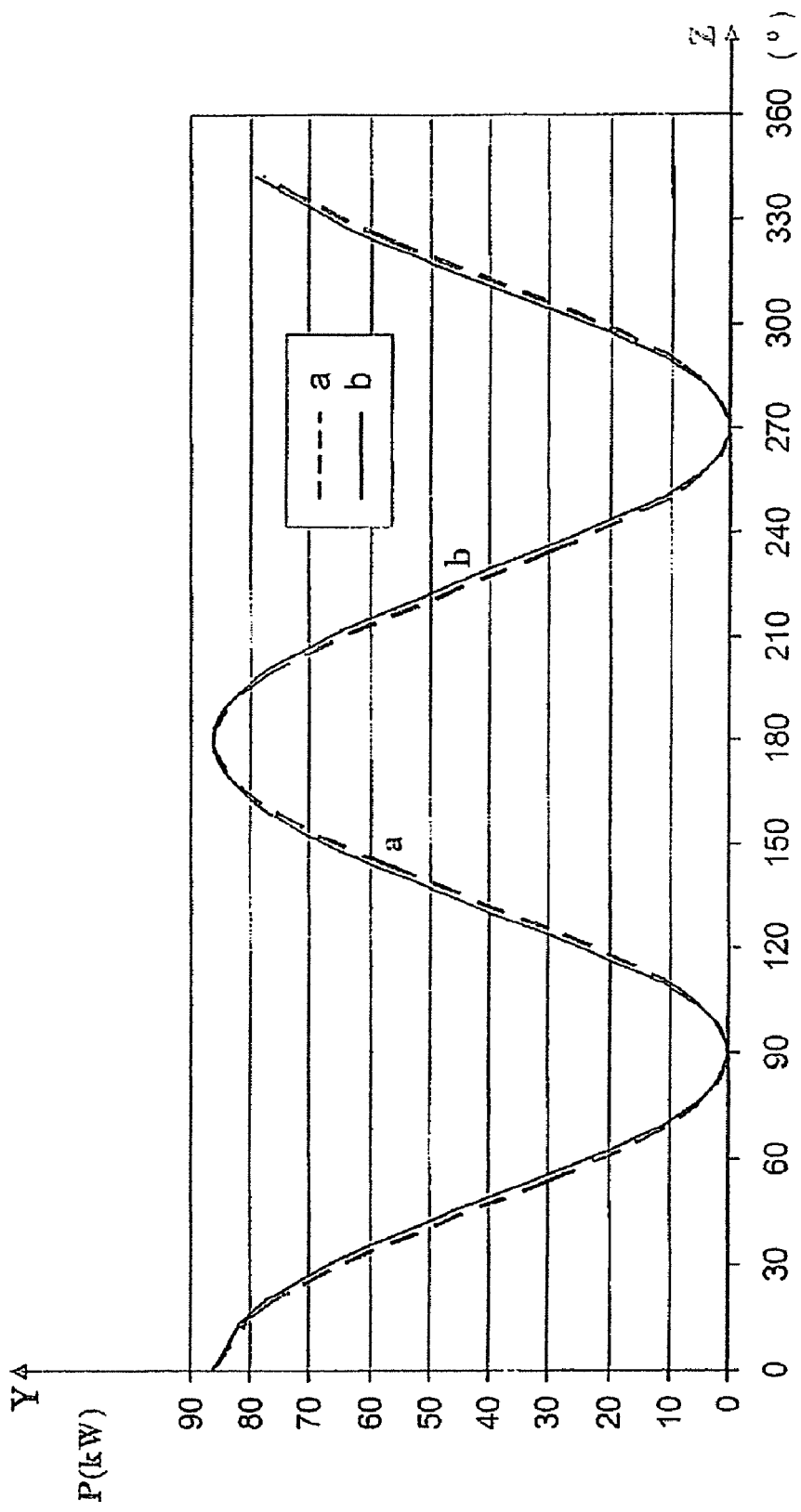
FIG. 16 shows a graph representing the power obtained as a function of angle of orientation of the floating structure.

FIG. 16 shows a graph that represents the result of numerical simulations made to study the variation of power generated (kW, Y-axis) as a function of the orientation angle (in degrees, X-axis) of the floating structure (1). It shows the real power (b) with respect to an ideal sine wave (a). It can be seen that changing the device orientation reduces the power generated in a form akin to a sine wave. Therefore, the floating structure (1) must be aligned with the direction of travel of the waves. It can be determined that for a change in orientation of ±20°, the power loss is approximately 9%.

The floating structure (1) also comprises a mooring system. This mooring system comprises ties that allow the floating structure (1) to revolve 360°, thereby maximising the efficiency in harnessing directional energy. The mooring system is located on the bottom of the floating structure (1), preferably between its prow and central section, in order to reduce the dependence with the degree or freedom of wave energy harnessing efficiency (pitch). The mooring system is preferably designed for sea depths of 50 to 100 m.

In addition, in a specific embodiment, the floating structure (1) incorporates a device for correcting the position of the structure (1) with respect to the direction of the waves (β).

This corrective device can consist of a number of impellers, screws or jets transverse to the prow of the structure (1).

Figure 17A:
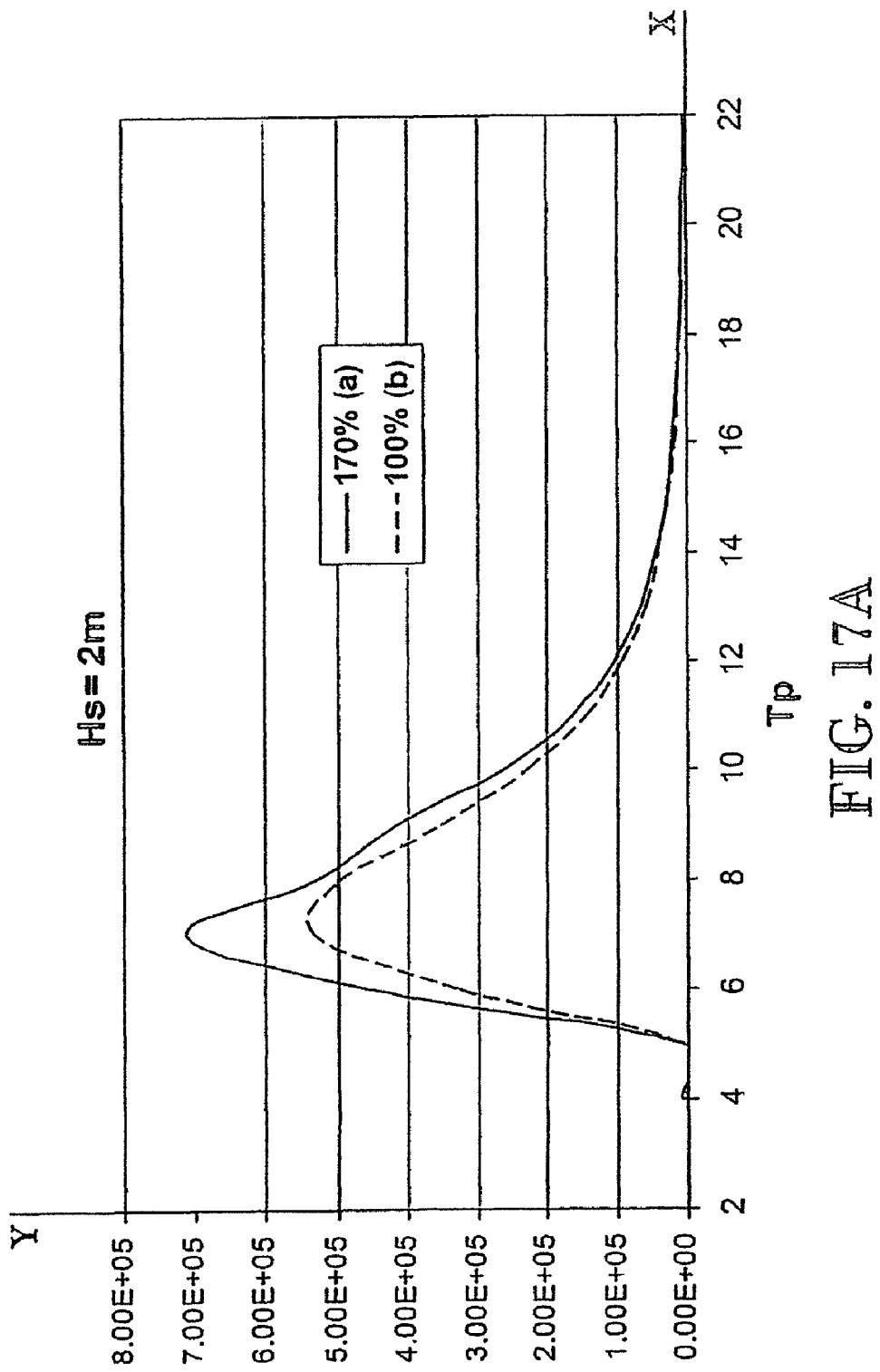
FIGS. 17A and 17B shows graphs representing the resonance power for several situations.
Figure 17B:
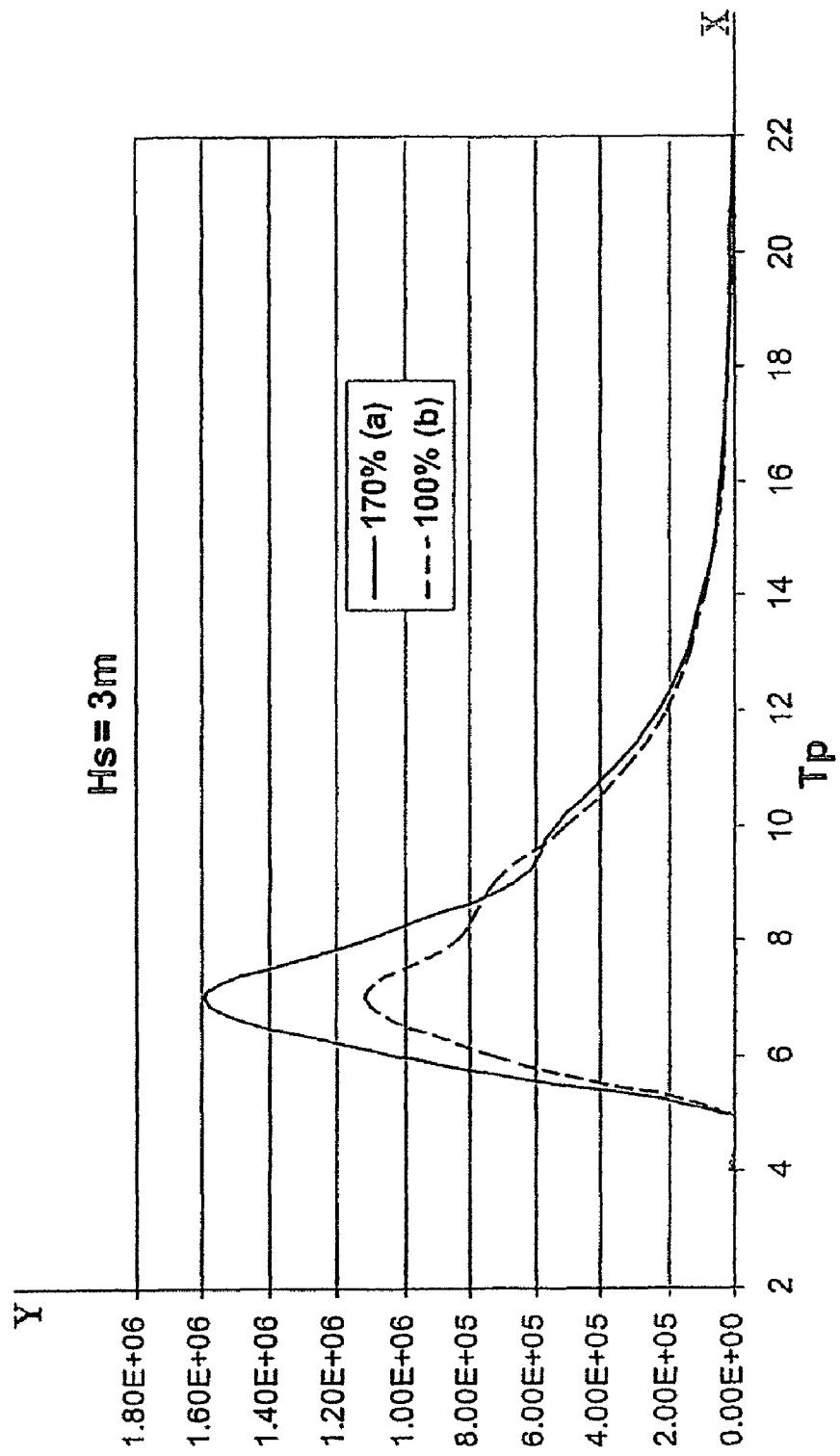

It was explained above that, in order to increase the longitudinal inertia of the floating structure (1), ballast (22) is added preferably on the ends of the structure (1). FIGS. 17A and 17B show the resonant power (Y-axis, in Watts (W)) as a function of the peak wave period (Tp) (X-axis, in seconds) for two different longitudinal inertia percentage values: 170% (a) and 100% (b), and for two significant wave heights (Hs): 2 meters (FIG. 17A) and 3 meters (FIG. 17B). As seen in FIGS. 17A and 17B, the power obtained increases with longitudinal inertia.

Figure 18:
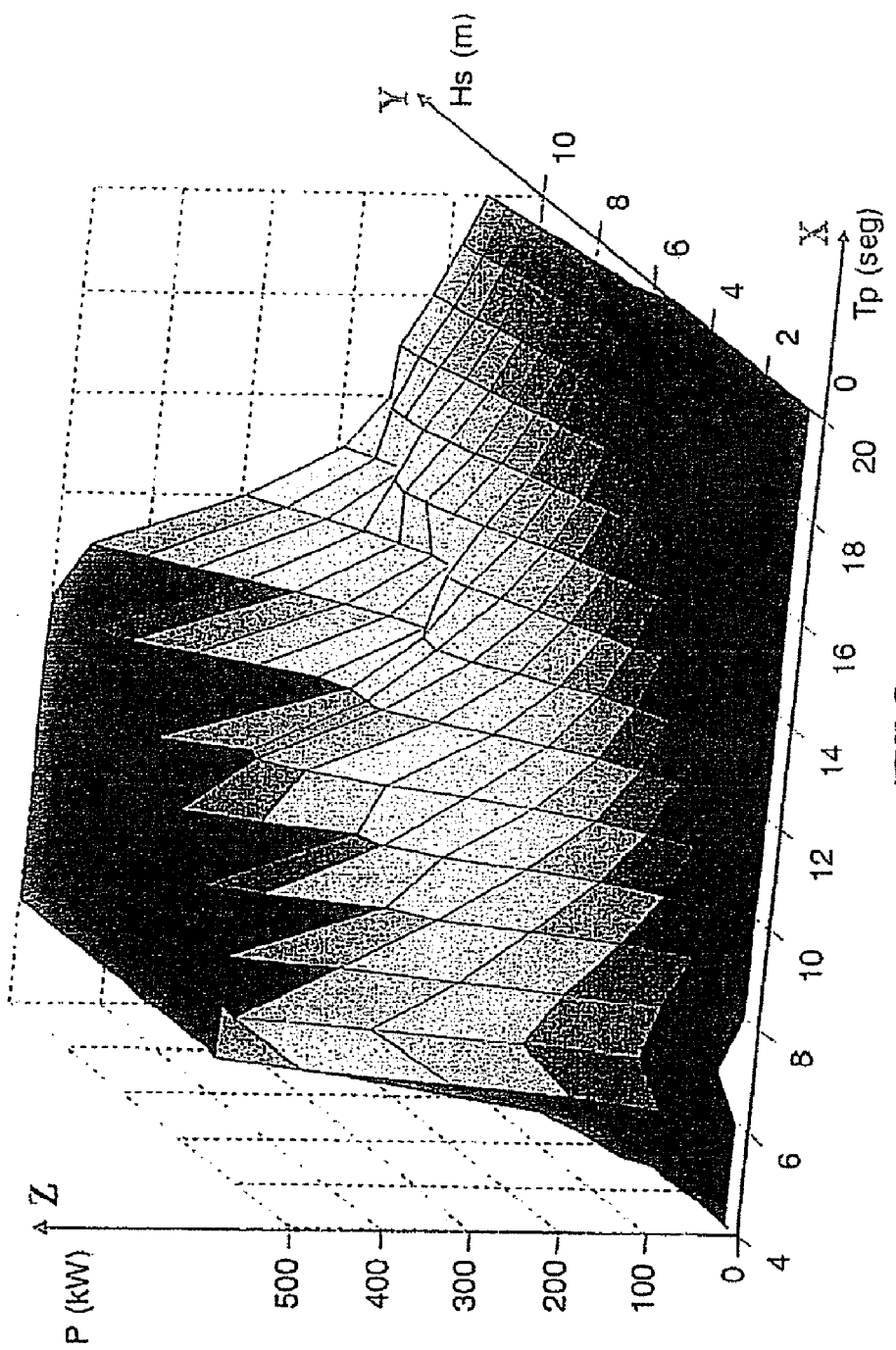
FIG. 18 represents the average power surface as a function of sea conditions (Hs, Tp).

FIG. 18 shows a graph representing average power (Z-axis, in Watts (W)) as a function of sea conditions: wave height in meters (X-axis) and period in seconds (Y-axis).

In short, the system or installation for harnessing wave energy of the present invention optimises:
1) the speed of rotation of the capturer device (5), by controlling the wave height, wave peak period and wave direction of travel;
2) the resistance torque applied, by controlling at least the wave height and wave peak period, and preferably also the wave direction of travel;
3) the position of the floating structure (1) with respect to the wave direction.

The installation or system for harnessing wave energy of the present invention, allows building marine installations with multiple units and increasing the total production of electricity.

In view of this description and set of drawings, an expert in the art can understand that the invention has been described according to preferred embodiments thereof, but that many variations can be made in said preferred embodiments without affecting the object of the invention as claimed.

The invention claimed is:

1. Installation for harnessing wave energy, comprising:
a floating structure that comprises at least one gyroscopic device, which in turn comprises a flywheel disposed so that it can turn driven by a motor placed on a shaft of said flywheel, and a generator placed on a shaft orthogonal to the aforementioned shaft of said flywheel, the generator being configured so that when the gyroscopic device is in use, said flywheel is subjected to a pitching torque caused by the motion of the waves that can feed said generator,
said installation further comprising:
a floating device for capturing data that can capture data on the waves;
means for controlling the motor;
means for controlling the generator;
wherein said captured data on the waves are a significant wave height (Hs), a wave peak period (Tp) and a direction of travel of the waves (β),
said installation further comprising:
means for transmitting the data captured by the data-capturing floating device and for receiving said data in the floating structure;
a control unit configured for, based on the data captured by the data-capturing floating device:
calculating an optimum rotation velocity ($\dot{\phi}$) of the gyroscopic device applicable to said motor;
obtaining an optimum resistance torque constant (K);
from said optimum resistance torque constant (K), calculating a resistance torque (Mr, $N_\psi$) applicable to the generator at each rolling cycle of a bidirectional oscillating rolling motion, said resistance torque (Mr, $N_\psi$) being proportional to the rolling velocity ($\dot{\psi}$) at each time instant;
applying said resistance torque (Mr, $N_\psi$) to the generator and in turn to the shaft orthogonal to the aforementioned shaft.

2. Installation according to claim 1, in which said means for controlling the motor comprise at least one control device and one power converter.

3. Installation according to claim 1, in which said means for controlling the generator comprise at least one control device and one power converter.

4. Installation according to claim 1, in which said means for transmitting and receiving the captured data are wireless transmission/reception means.

5. Installation according to claim 1, in which the gyroscopic device is placed inside a vacuum chamber.

6. Installation according to claim 1, in which the floating structure has an elongated shape, the ratio of its breadth to its length being from 1/12 to 1/6.

7. Installation according to claim 1, in which the floating structure also comprises ballast elements placed on the ends of said floating structure.

8. Installation according to claim 1, in which the floating structure also comprises a mooring system.

9. Installation according to claim 1, in which the floating structure also comprises a device for correcting its position with respect to the direction of the waves.

10. Installation according to claim 1, in which the generator is a rotating generator.

11. Method for harnessing wave energy comprising the following stages:
subjecting at least one gyroscopic device placed in a floating structure to a pitching motion caused by the waves;
turning a flywheel comprised in said gyroscopic device by the action of a motor, so that said pitching motion caused by the waves is transformed into an oscillating rolling motion about an axis, said oscillating rolling motion being bidirectional;
feeding with said oscillating rolling motion a generator placed on a shaft orthogonal to the aforementioned shaft of said flywheel;
capturing a series of data on the waves at different time instants;
sending said data to a control unit placed in said floating structure wherein said captured data on the waves are a significant wave height (Hs), a wave peak period (Tp) and a direction of travel of the waves (β),
the method further comprising the steps of:
obtaining from said data on the waves:
an optimum rotation velocity ($\dot{\phi}$) of the gyroscopic device (5) applicable to said motor and
an optimum resistance torque constant (K);
calculating from said optimum resistance torque constant (K) a resistance torque (Mr, $N_\psi$) applicable to the generator at each rolling cycle of said bidirectional oscillating rolling motion, said resistance torque (Mr, $N_\psi$) being proportional to the rolling velocity ($\dot{\psi}$) at each time instant; and
applying said resistance torque (Mr, $N_\psi$) to the generator and in turn to a shaft orthogonal to the aforementioned shaft of said flywheel, thus allowing maintaining the gyroscopic device in phase with the waves and maximizing the energy use.

12. Method according to claim 11, wherein the rotation velocity of the gyroscopic device is independent from the height of the waves.

13. Method according to claim 11, wherein said resistance torque (Mr, $N_\psi$) applied to the generator varies at each cycle instant of the waves.

* * * * *